(12) United States Patent
Tsukamoto et al.

(10) Patent No.: US 11,309,586 B2
(45) Date of Patent: Apr. 19, 2022

(54) POWER STORAGE DEVICE DISCHARGE CIRCUIT, POWER STORAGE SYSTEM, AND VEHICLE EQUIPPED WITH SAME

(71) Applicant: Panasonic Intellectual Property Management Co., Ltd., Osaka (JP)

(72) Inventors: Hiroaki Tsukamoto, Aichi (JP); Yohsuke Mitani, Osaka (JP); Takahiro Kudo, Kyoto (JP); Yoshimitsu Odajima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 17/011,046

(22) Filed: Sep. 3, 2020

(65) Prior Publication Data

US 2020/0403277 A1    Dec. 24, 2020

Related U.S. Application Data

(63) Continuation of application No. PCT/JP2019/012823, filed on Mar. 26, 2019.

(30) Foreign Application Priority Data

Mar. 28, 2018  (JP) .............................. JP2018-063271

(51) Int. Cl.
*H01M 10/42* (2006.01)
*H01M 10/44* (2006.01)
*B60L 58/10* (2019.01)

(52) U.S. Cl.
CPC ..... *H01M 10/4235* (2013.01); *H01M 10/425* (2013.01); *H01M 10/4207* (2013.01); *H01M 10/441* (2013.01); *B60L 58/10* (2019.02)

(58) Field of Classification Search
CPC ......... H01M 10/4235; H01M 10/4207; H01M 10/425; H01M 10/441; B60L 58/10;
(Continued)

(56) References Cited

U.S. PATENT DOCUMENTS

2009/0261782 A1    10/2009  Morita
2014/0042972 A1*    2/2014  Kim .................... H02J 7/0016
                                                           320/118
(Continued)

FOREIGN PATENT DOCUMENTS

JP          2008-043036       2/2008

OTHER PUBLICATIONS

International Search Report of PCT application No. PCT/JP2019/012823 dated Jun. 18, 2019.

*Primary Examiner* — Nathaniel R Pelton
(74) *Attorney, Agent, or Firm* — McDermott Will & Emery LLP

(57) ABSTRACT

A discharge circuit includes a plurality of burden circuits that are electrically connected in parallel to a plurality of power storage units, respectively. Each of the plurality of burden circuits includes (i) a resistor and a switch that are electrically connected in series between both ends of a corresponding one of the plurality of power storage units, and (ii) a control terminal that controls the switch according to a potential of the control terminal. The plurality of burden circuits are electrically connected in series between a positive electrode and a negative electrode. The control terminal of a n+1-th burden circuit from a reference point is electrically connected, via the switch of the n-th burden circuit from the reference point, to a reference point side terminal of a n-th power storage unit from the reference point. The reference point is the positive electrode or the negative electrode.

10 Claims, 9 Drawing Sheets

(58) Field of Classification Search
CPC ...... H02J 7/0016; H02J 7/0025; H02J 7/0026; H02J 2007/0067; H02J 2007/0069
USPC ........................................................ 320/127
See application file for complete search history.

(56) References Cited

U.S. PATENT DOCUMENTS

2014/0292345 A1* 10/2014 Matumoto ............ B60L 3/0038
324/434
2018/0316197 A1* 11/2018 Zhang ................... H02J 7/0019

* cited by examiner

POWER STORAGE DEVICE DISCHARGE CIRCUIT, POWER STORAGE SYSTEM, AND VEHICLE EQUIPPED WITH SAME

RELATED APPLICATIONS

This application is a continuation of the PCT International Application No. PCT/JP2019/012823 filed on Mar. 26, 2019, which claims the benefit of foreign priority of Japanese patent application No. 2018-063271 filed on Mar. 28, 2018, the contents all of which are incorporated herein by reference.

BACKGROUND

1. Technical Field

The present disclosure generally relates to a discharge circuit for a power storage device, a power storage system, and a vehicle equipped with the same, and more particularly to a discharge circuit for a power storage device including a plurality of power storage units that are electrically connected in series between a positive electrode and a negative electrode, a power storage system, and a vehicle equipped with the same.

2. Description of the Related Art

Unexamined Japanese Patent Publication No. 2008-43036 describes that in an electric storage device in which a plurality of power storage units (power storage elements) each constituted by electrically double-layered capacitor are connected in series, an equalizing voltage circuit is connected in parallel to each power storage unit.

Each of the equalizing voltage circuits has a resistor (balance resistor) and a switch (balance switch). The resistor and the switch are connected in series between both ends of the power storage unit. Resistance values of a plurality of the resistors are substantially equal. The switch is a switch that can be controlled ON and OFF from the outside like a relay switch. A plurality of the switches are configured to be turned on and off at the same time. Thus, when all the switches are turned on, the resistor is connected in parallel to each of the power storage units. And then both end voltage of each of the power storage units is automatically adjusted such that the both end voltages of the plurality of power storage units become equal.

SUMMARY

A discharge circuit for a power storage device according to an aspect of the present disclosure is used for a power storage device including a plurality of power storage units that are electrically connected in series between a positive electrode and a negative electrode. The discharge circuit includes a plurality of burden circuits that are electrically connected in parallel to the plurality of power storage units, respectively. Each of the plurality of burden circuits includes (i) a resistor and a switch that are electrically connected in series between both ends of a corresponding one of the plurality of power storage units, and (ii) a control terminal that controls the switch according to a potential of the control terminal. The plurality of burden circuits are electrically connected in series between the positive electrode and the negative electrode. The control terminal of a n+1-th burden circuit from a reference point among the plurality of burden circuits is electrically connected, via the switch of a n-th burden circuit from the reference point among the plurality of burden circuits, to a reference point side terminal of a n-th power storage unit from the reference point among the plurality of power storage units. The reference point is the positive electrode or the negative electrode.

A power storage system according to an aspect of the present disclosure includes the discharge circuit for the power storage device and the power storage device.

A vehicle according to an aspect of the present disclosure includes the power storage system and a vehicle body provided with the power storage system.

The present disclosure has an advantage that a circuit configuration can be simplified.

BRIEF DESCRIPTION OF THE DRAWINGS

FIGS. 3A to 3C are explanatory views showing an operation when switches of a discharge circuit in the power storage system of the first exemplary embodiment are sequentially turned on;

FIGS. 6A to 6C are explanatory views showing an operation when switches of a discharge circuit in the power storage system of the second exemplary embodiment are sequentially turned on;

DETAILED DESCRIPTION OF EMBODIMENT

In the configuration described in Unexamined Japanese Patent Publication No. 2008-43036, in order to turn on a plurality of switches, a plurality of drive circuits and a control circuit having a plurality of output ports in order to control the drive circuits are required, and this hinders simplification of the circuit configuration.

The present disclosure has been made in view of the above circumstances, and provides a discharge circuit for a power storage device that can simplify a circuit configuration, a power storage system, and a vehicle equipped with the same.

First Exemplary Embodiment

(1) Overview

Figure 1:
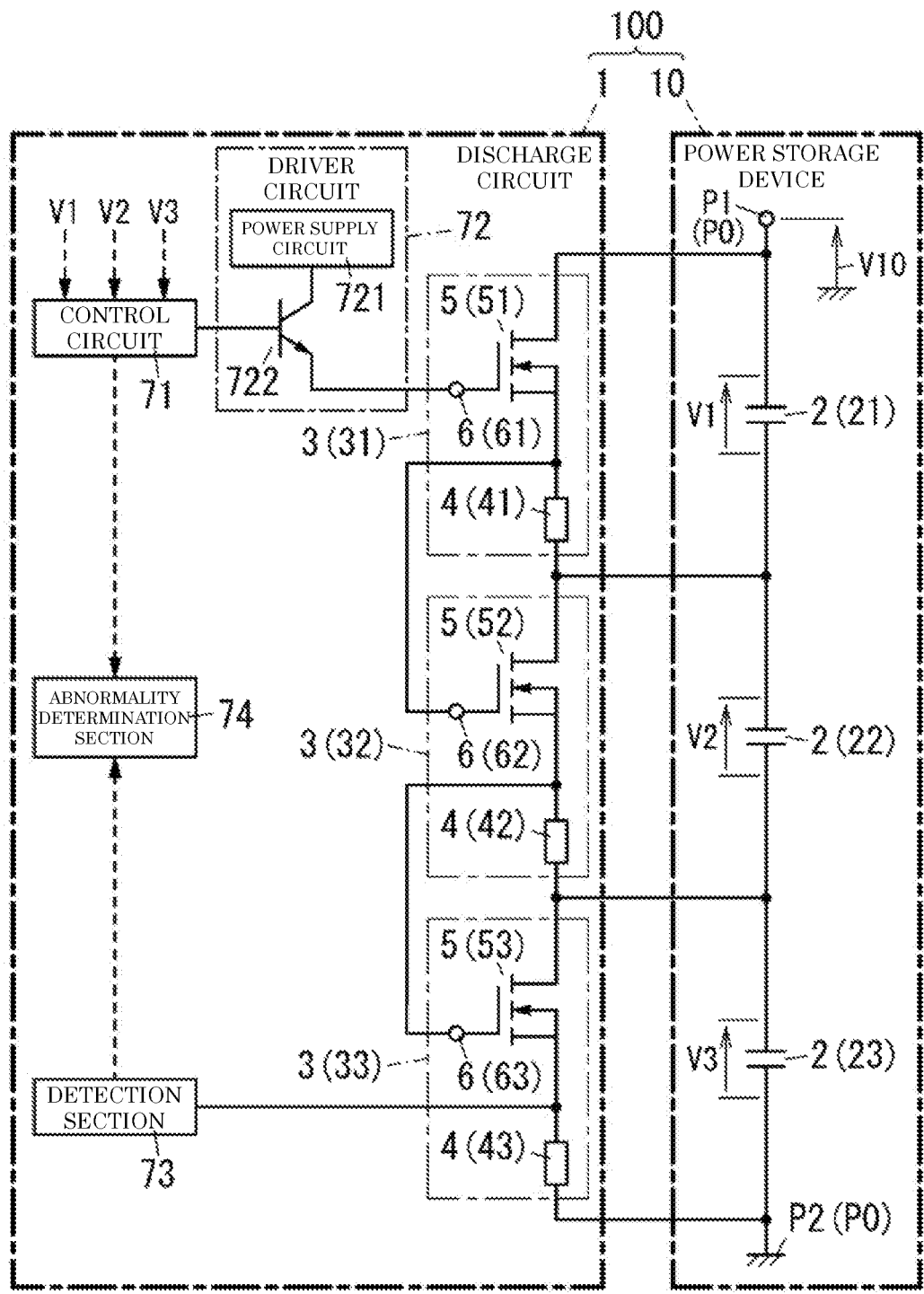
FIG. 1 is a schematic diagram showing a configuration of a power storage system according to a first exemplary embodiment.

Discharge circuit 1 for power storage device 10 (hereinafter, also simply referred to as "discharge circuit 1") according to the present exemplary embodiment is used for power storage device 10 including a plurality of power storage units 2 as shown in FIG. 1. The plurality of power storage units 2 are electrically connected in series between positive electrode P1 and negative electrode P2.

Power storage device 10 is electrically connected between power supply 101 (see FIG. 2) and load 102 (see FIG. 2) as an example. In this case, power storage device 10 temporarily stores electric energy input from power supply 101 and supplies the stored electric energy to load 102. Such power storage device 10 can, for example, instantaneously (temporarily) supply electric energy larger than that of power supply 101 to load 102 and supplement the supply of the electric energy to load 102 when the electric energy output from power supply 101 decreases.

Here, discharge circuit 1 according to the present exemplary embodiment constitutes power storage system 100 together with power storage device 10. In other words, power storage system 100 includes discharge circuit 1 and power storage device 10.

In such power storage system 100, discharge circuit 1 discharges an electric charge (electric energy) stored in power storage device 10. That is, discharge circuit 1 discharges power storage device 10 by electrically connecting an element that consumes the electric energy, such as a resistor, to power storage device 10. In the present exemplary embodiment, a case where discharge circuit 1 functions as a balance circuit will be described as an example. Discharge circuit 1 as the balance circuit adjusts both end voltages V1, V2, V3 of each power storage unit 2 in power storage device 10 such that variation among the plurality of power storage units 2 is reduced. When the variation in both end voltages V1, V2, V3 of each power storage unit 2 among the plurality of power storage units 2 is reduced, overcharging to some of the plurality of power storage units 2 is suppressed. Thus, the life of power storage device 10 can be extended.

By the way, discharge circuit 1 includes a plurality of burden circuits 3. The plurality of burden circuits 3 are electrically connected in parallel to the plurality of power storage units 2, respectively. Each of the plurality of burden circuits 3 has resistor 4, switch 5, and control terminal 6. Resistor 4 and switch 5 are electrically connected in series between both ends of a corresponding one of the plurality of power storage units 2. Control terminal 6 controls switch 5 according to a potential of control terminal 6. The plurality of burden circuits 3 are electrically connected in series between positive electrode P1 and negative electrode P2.

Control terminal 6 of n+1-th burden circuit 3 from reference point P0 is electrically connected, via switch 5 of n-th burden circuit 3 from reference point P0, to a terminal closer to reference point P0 (a reference point side terminal) of n-th power storage unit 2 from reference point P0. "n" is a natural number. Here, "n-th burden circuit 3 from reference point P0" means "n-th" burden circuit 3 as counted from reference point P0 among the plurality of burden circuits 3. Similarly, "n-th power storage unit 2 from reference point P0" means "n-th" power storage unit 2 as counted from reference point P0 among the plurality of power storage units 2. Reference point P0 is positive electrode P1 or negative electrode P2 of power storage device 10.

In the following description, when the plurality of power storage units 2 are distinguished, the plurality of power storage units 2 are referred to respectively as "power storage unit 21", "power storage unit 22", and "power storage unit 23" in order from positive electrode P1. Similarly, when the plurality of burden circuits 3 are distinguished, the plurality of burden circuits 3 are referred to respectively as "burden circuit 31," "burden circuit 32", and "burden circuit 33" in order from positive electrode P1. When resistors 4 of the respective burden circuits 3 are distinguished, resistors 4 of burden circuits 31, 32, 33 are referred to respectively as "resistor 41", "resistor 42", and "resistor 43". Similarly, switches 5 of burden circuits 31, 32, 33 are referred to respectively as "switch 51", "switch 52", and "switch 53", and control terminals 6 of burden circuits 31, 32, 33 are referred to respectively as "control terminal 61", "control terminal 62", and "control terminal 63".

In the present exemplary embodiment, a case where reference point P0 is positive electrode P1 will be described as an example. Thus, if "n" is "1", second burden circuit 32 as counted from positive electrode P1 (reference point P0) among the plurality of burden circuits 31, 32, 33 is "n+1-th burden circuit 3 from reference point P0". Similarly, if "n" is "1", power storage unit 21 closest to positive electrode P1 (reference point P0) of the plurality of power storage units 21, 22, 23 is "n-th power storage unit 2 from reference point P0". In short, n-th burden circuit 3 and power storage unit 2 from reference point P0 are represented by "burden circuit 3n" and "power storage unit 2n", respectively. In the following description, a side of reference point P0 is defined as "higher order", and a side opposite to reference point P0 is defined as "lower order".

In discharge circuit 1 having the above configuration, in n+1-th burden circuit 3 from reference point P0, control terminal 6 that controls switch 5 according to the potential is electrically connected, via switch 5 of n-th burden circuit 3 from reference point P0, to n-th power storage unit 2 from reference point P0. In other words, control terminal 6 of n+1-th burden circuit 3 from reference point P0 is electrically connected, via switch 5 of next higher burden circuit 3, to next higher power storage unit 2. In the example of FIG. 1, control terminal 62 of burden circuit 32 is electrically connected, via switch 51 of burden circuit 31, to the terminal closer to reference point P0 of power storage unit 21. Similarly, control terminal 63 of burden circuit 33 is electrically connected, via switch 52 of burden circuit 32, to the terminal closer to reference point P0 of power storage unit 22.

Consequently, when switch 5 of n-th burden circuit 3 from reference point P0 is turned on, control terminal 6 of n+1-th burden circuit 3 from reference point P0 is connected to the terminal closer to reference point P0 of n-th power storage unit 2 from reference point P0. At this time, the potential of control terminal 6 of n+1-th burden circuit 3 from reference point P0 is changed by power storage unit 2, so that switch 5 of n+1-th burden circuit 3 from reference point P0 is turned on. In other words, when switch 5 of next higher burden circuit 3 is turned on, each of the plurality of switches 5 is turned on by using the electric energy stored in next higher power storage unit 2. In the example of FIG. 1, when switch 51 of burden circuit 31 is turned on, switch 52 of burden circuit 32 is turned on by using the electric energy of power storage unit 21 in conjunction with turning on of switch 51. Similarly, when switch 52 of burden circuit 32 is turned on, switch 53 of burden circuit 33 is turned on by using the electric energy of power storage unit 22 in conjunction with turning on of switch 52.

As a result, in discharge circuit 1, switch 5 of highest burden circuit 3 (first burden circuit 3 from reference point P0 among the plurality of burden circuits 3) is only turned on to automatically sequentially turn on switches 5 of remaining burden circuits 3. As described above, in discharge circuit 1 according to the present exemplary embodiment, switches 5 of the plurality of burden circuits 3 are interlocked with each other to be turned on in a domino manner from the higher order to the lower order. Thus, in discharge circuit 1, all switches 5 of the plurality of burden circuits 3 can be controlled only by controlling switch 5 of highest burden circuit 3, and it is possible to simplify the circuit configuration.

(2) Details

Hereinafter, power storage system 100 according to the present exemplary embodiment will be described in detail with reference to FIGS. 1 to 3C.

Figure 2:
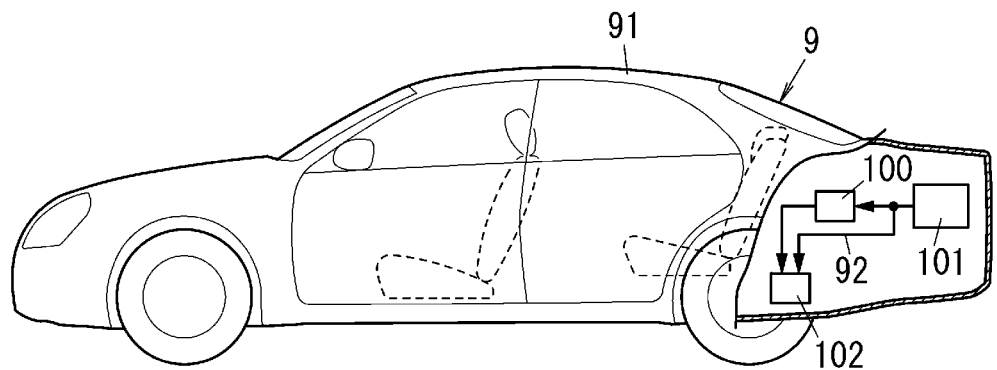
FIG. 2 is a schematic diagram illustrating a vehicle including the power storage system of the first exemplary embodiment.

Power storage system 100 according to the present exemplary embodiment is, for example, a system for a vehicle and constitutes vehicle 9 together with vehicle body 91 as shown in FIG. 2. In other words, vehicle 9 includes power storage system 100 and vehicle body 91. Vehicle body 91 is provided with power storage system 100. Vehicle body 91 is also provided with power supply 101 and load 102. In the present exemplary embodiment, as an example, vehicle 9 is an automobile that travels on a road surface with a person on board. Vehicle 9 may be an electric automobile, a gasoline engine vehicle, a diesel engine vehicle, a hybrid vehicle, or the like. Furthermore, vehicle 9 may be an electric motorcycle (two-wheeled vehicle) or the like. In the example of FIG. 2, vehicle 9 includes direct connection circuit 92 for electrically connecting power supply 101 and load 102 on a path different from the path of power storage system 100. That is, direct connection circuit 92 is electrically connected between power supply 101 and load 102, and power can be supplied from power supply 101 to load 102 through direct connection circuit 92 without power storage system 100. Thus, power storage system 100 forms a path for supplying power to load 102, separately from a path passing through direct connection circuit 92, and achieves redundancy of power supply to load 102.

Power supply 101 is, for example, a storage battery (vehicle-mounted battery) that is mounted on vehicle body 91 and outputs a DC voltage. This type of power supply 101 can be charged by, for example, supplying electric power input from the outside of vehicle body 91, electric power generated by a generator while vehicle body 91 is running, regenerative electric power generated by an electric motor, or the like to power supply 101. In the present exemplary embodiment, as an example, load 102 is mounted on vehicle body 91 and is assumed to be an idling stop system (including a sel-motor) that operates by applying a DC voltage, a braking system, a hybrid system, or the like.

In the present exemplary embodiment, all of the plurality of constituent elements of power storage system 100 are housed in a single housing. The housing is fixed to vehicle body 91. Vehicle body 91 is provided with power supply 101 and load 102 together with power storage system 100. Power supply 101 and load 102 are electrically connected by direct connection circuit 92. Power storage system 100 connects power supply 101 and load 102 on a path different from the path of direct connection circuit 92.

(2.1) Configuration

Discharge circuit 1 according to the present exemplary embodiment includes the plurality of burden circuits 3 as shown in FIG. 1. Here, discharge circuit 1 is used for power storage device 10 including three power storage units 21, 22, 23. Thus, discharge circuit 1 includes three burden circuits 31, 32, 33 corresponding to three power storage units 21, 22, 23, respectively. Discharge circuit 1 according to the present exemplary embodiment further includes control circuit 71, driver circuit 72, detection section 73, and abnormality determination section 74. At least one of control circuit 71, driver circuit 72, detection section 73, and abnormality determination section 74 may not be included in the constituent elements of discharge circuit 1.

In the present exemplary embodiment, power storage device 10 is, for example, an electrochemical device (power storage device) having a higher output density than the output density of a lithium ion battery (LIB) or the like. In the present exemplary embodiment, power storage device 10 is, for example, an electric double-layer capacitor (EDLC) and is configured by electrically connecting a plurality of cells in series. Here, each of the plurality of cells constitutes power storage unit 2. In short, as shown in FIG. 1, power storage device 10 has positive electrode P1, negative electrode P2, and the plurality of cells (power storage units 2) electrically connected in series between positive electrode P1 and negative electrode P2.

Here, rated voltages of both end voltages V1, V2, V3 of each of the cells (power storage units 2) are, for example, 2.5 [V]. Thus, in the configuration in which the three cells (power storage units 21, 22, 23) are electrically connected in series, if both end voltages V1, V2, V3 of all the cells are at the rated voltage, composite voltage V10 of 7.5 [V] is generated between positive electrode P1 and negative electrode P2. Power storage device 10 having such a configuration is charged by connecting positive electrode P1 and negative electrode P2 to power supply 101 through a charge circuit and storing the electric energy supplied from power supply 101 via the charge circuit. On the other hand, power storage device 10 is discharged by connecting positive electrode P1 and negative electrode P2 to load 102 through a discharge circuit and supplying the electric energy to load 102 via the discharge circuit.

The plurality of burden circuits 3 are electrically connected in parallel to corresponding power storage units 2, respectively. That is, as shown in FIG. 1, burden circuit 31 is electrically connected in parallel to power storage unit 21, burden circuit 32 is electrically connected in parallel to power storage unit 22, and burden circuit 33 is electrically connected in parallel to power storage unit 23.

Each of the plurality of burden circuits 3 has resistor 4, switch 5, and control terminal 6. Resistor 4 and switch 5 are electrically connected in series between both ends of each of the plurality of power storage units 2. That is, resistor 41 and switch 51 of burden circuit 31 are electrically connected in series between both ends of power storage unit 21. Similarly, resistor 42 and switch 52 of burden circuit 32 are electrically connected in series between both ends of power storage unit 22, and resistor 43 and switch 53 of burden circuit 33 are electrically connected in series between both ends of power storage unit 23. Here, in a series circuit of resistor 4 and switch 5 in each of the plurality of burden circuits 3, switch 5 and resistor 4 are connected in this order between both ends of corresponding power storage unit 2, when viewed from a terminal closer to positive electrode P1 of power storage unit 2. In other words, in each of the plurality of burden circuits 3, switch 5 is electrically connected to the terminal closer to positive electrode P1 of corresponding power storage unit 2 via resistor 4.

Each resistor 4 is an element (resistor) having an electric resistance. In the present exemplary embodiment, since discharge circuit 1 functions as a balance circuit as described above, resistance values of the plurality of resistors 41, 42, 43 are substantially identical. It is not essential that the resistance values of the plurality of resistors 41, 42, 43 are exactly identical, and some errors are allowed.

Switch 5 is an element that switches between an ON (conducting) state and an OFF (non-conducting) state according to the potential of control terminal 6 described later. In each of the plurality of burden circuits 3, switch 5 is electrically connected in series with resistor 4 between both ends of corresponding power storage unit 2. In other words, switch 5 is inserted between power storage unit 2 and resistor 4 and switches the electrical connection state (conducting state or non-conducting state) between power storage unit 2 and resistor 4. Consequently, in each of the plurality of burden circuits 3, when switch 5 is in the ON state, corresponding power storage unit 2 and resistor 4 are electrically conducted, and a current flows from power storage unit 2 to resistor 4. At this time, the electric energy stored in power storage unit 2 is consumed by resistor 4, so that power storage unit 2 is discharged by burden circuit 3. On the other hand, in each of the plurality of burden circuits 3, when switch 5 is in the OFF state, corresponding power storage unit 2 and resistor 4 become non-conductive, and no current flows from power storage unit 2 to resistor 4, so that power storage unit 2 is not discharged by burden circuit 3.

Here, switch 5 is, for example, a semiconductor element including an enhancement type n-channel metal-oxide-semiconductor field effect transistor (MOSFET). Since switch 5 has a parasitic diode, switch 5 is connected in a direction in which a cathode of the parasitic diode is located closer to positive electrode P1 between positive electrode P1 and negative electrode P2 of power storage device 10 such that a current does not flow from positive electrode P1 to negative electrode P2 through the parasitic diode. That is, switch 5 is connected between both ends of power storage unit 2 such that a drain is closer to positive electrode P1 and a source is closer to negative electrode P2. Specifically, a drain of switch 51 of burden circuit 31 is connected to a terminal (the same as positive electrode P1) closer to positive electrode P1 of power storage unit 21, and a source of switch 51 is connected to a terminal closer to negative electrode P2 of power storage unit 21 via resistor 41. Similarly, a drain of switch 52 of burden circuit 32 is connected to a terminal closer to positive electrode P1 of power storage unit 22, and a source of switch 52 is connected to a terminal closer to negative electrode P2 of power storage unit 22 via resistor 42. A drain of switch 53 of burden circuit 33 is connected to a terminal closer to positive electrode P1 of power storage unit 23, and a source of switch 53 is connected to a terminal (the same as positive electrode P2) closer to negative electrode P2 of power storage unit 23 via resistor 43.

Control terminal 6 is a terminal that controls switch 5 according to the potential. That is, the plurality of burden circuits 3 are electrically connected in series between positive electrode P1 and negative electrode P2. In the present exemplary embodiment, since switch 5 is the n-channel MOSFET as described above, control terminal 6 is a gate (or the terminal connected to the gate) of switch 5. Specifically, switch 5 is turned off when a gate-source voltage is less than or equal to a predetermined threshold voltage, and is turned on when the voltage exceeds the threshold voltage. Thus, when the potential of control terminal 6 becomes such a potential that generates a potential difference exceeding the threshold voltage as compared with a source potential of switch 5, switch 5 is turned on.

Here, control terminal 6 of n+1-th burden circuit 3 from reference point P0 is electrically connected to the terminal closer to reference point P0 of n-th power storage unit 2 from reference point P0 via switch 5 of n-th burden circuit 3 from reference point P0 ("n" is a natural number). In the present exemplary embodiment, since positive electrode P1 is reference point P0 as described above, n-th burden circuit 3 and n-th power storage unit 2 from reference point P0 are represented by "burden circuit 3n" and "power storage unit 2n", respectively.

In short, in n+1-th burden circuit 3 from reference point P0, control terminal 6 is electrically connected, via switch 5 of n-th burden circuit 3 from reference point P0, to n-th power storage unit 2 from reference point P0. Specifically, control terminal 62 of burden circuit 32 is connected to a connection point between switch 51 and resistor 41 of next higher burden circuit 31, that is, the source of switch 51. Consequently, control terminal 62 of burden circuit 32 is electrically connected to the terminal closer to reference point P0 (positive electrode P1) of power storage unit 21 via switch 51 of burden circuit 31. Similarly, control terminal 63 of burden circuit 33 is connected to a connection point between switch 52 and resistor 42 of next higher burden circuit 32, that is, the source of switch 52. Consequently, control terminal 63 of burden circuit 33 is electrically connected to the terminal closer to reference point P0 (positive electrode P1) of power storage unit 22 via switch 52 of burden circuit 32.

The "terminal" in the present disclosure, such as control terminal 6 or the terminal closer to reference point P0 of power storage unit 2, may not be a component for connecting an electric wire and the like and may be, for example, a lead of an electronic component or a portion of a conductor included in a circuit board.

As described above, in each burden circuit 3, the state where corresponding power storage unit 2 is discharged and the state where corresponding power storage unit 2 is not discharged are switched by switching the ON state and the OFF state of switch 5. When switches 5 are turned on for all of the plurality of burden circuits 3, discharge in corresponding burden circuits 3 is performed for all of the plurality of power storage units 2. At this time, the plurality of resistors 4 in the plurality of burden circuits 3 are electrically connected in series between positive electrode P1 and negative electrode P2 of power storage device 10. That is, if switches 51, 52, 53 are turned on in all of the plurality of burden circuits 31, 32, 33, resistors 41, 42, 43 of the plurality of burden circuits 31, 32, 33 are electrically connected in series and become a plurality of voltage dividing resistors. Then, a voltage between positive electrode P1 and negative electrode P2 is divided according to the plurality of voltage dividing resistors (resistors 41, 42, 43), and a divided voltage is applied to each of the plurality of power storage units 21, 22, 23.

Consequently, discharge circuit 1 functions as a balance circuit, and both end voltages V1, V2, V3 of each power storage unit 2 in power storage device 10 can be adjusted so as to reduce variation among the plurality of power storage units 2. That is, in the present exemplary embodiment, since the resistance values of the plurality of resistors 41, 42, 43 are substantially identical as described above, composite voltage V10 (7.5 [V]) between positive electrode P1 and negative electrode P2 is divided into three equal voltages by the plurality of resistors 41, 42, 43. Thus, a divided reference voltage (2.5 [V]) of substantially the same magnitude is generated between both ends of each resistor 4, and this voltage is applied to each power storage unit 2 to adjust both end voltages V1, V2, V3 of each power storage unit 2 such that both end voltages V1, V2, V3 approach the reference voltage.

Control circuit 71 outputs a control signal for controlling the plurality of switches 5 in the plurality of burden circuits 3. However, in discharge circuit 1 according to the present exemplary embodiment, as described above, switch 51 of highest burden circuit 31 is only turned on to automatically sequentially turn on switches 52, 53 of remaining burden circuits 32, 33. Thus, control circuit 71 may perform ON/OFF control only for switch 51 of highest burden circuit 31.

Furthermore, since discharge circuit 1 according to the present exemplary embodiment functions as the balance circuit, control circuit 71 has a function of monitoring the variation in both end voltages V1, V2, V3 among the plurality of power storage units 2. Specifically, control circuit 71 monitors each of both end voltage V1 of power storage unit 21, both end voltage V2 of power storage unit 22, and both end voltage V3 of power storage unit 23, and judges whether or not the variation (difference) among both end voltages V1, V2, V3 is within an allowable range. When the variation among both end voltages V1, V2, V3 exceeds the allowable range, control circuit 71 operates such that switch 5 of discharge circuit 1 is turned on. Consequently, when the variation in both end voltages V1, V2, V3 among the plurality of power storage units 2 exceeds the allowable range, discharge circuit 1 operates, and both end voltages V1, V2, V3 of each power storage unit 2 are adjusted so as to approach the reference voltage.

In the present exemplary embodiment, since power storage system 100 is assumed to be used in vehicle 9, control circuit 71 further has a function of controlling switch 5 of discharge circuit 1 according to, for example, turning on/off of the power supply (ignition) of vehicle body 91. That is, control circuit 71 operates to turn off switch 5 of discharge circuit 1 when the power supply of vehicle body 91 is turned off. Consequently, when the power supply of vehicle body 91 is turned off, discharge circuit 1 does not operate. And thus the power consumption in power storage system 100 can be suppressed to a low value.

Thus, in the present exemplary embodiment, discharge circuit 1 operates only when the power supply of vehicle body 91 is turned on and the variation in both end voltages V1, V2, V3 among the plurality of power storage units 2 exceeds the allowable range.

Control circuit 71 is configured by, for example, a computer system (including a micro controller) including a central processing unit (CPU) and a memory. That is, the processor (CPU) functions as control circuit 71 by executing an appropriate program recorded in the memory. Control circuit 71 may be implemented by, for example, an electronic control unit (ECU) of vehicle body 91.

Driver circuit 72 is a circuit that drives switch 51 of highest burden circuit 31. Here, driver circuit 72 has power supply circuit 721 and transistor 722. Power supply circuit 721 is, for example, a DCDC converter such as a charge pump circuit. As described in detail later, in order to turn on switch 51 of highest burden circuit 31, it is necessary to apply a voltage greater than composite voltage V10 to control terminal 61 of burden circuit 31. Thus, power supply circuit 721 generates the voltage greater than composite voltage V10 by boosting composite voltage V10. Transistor 722 is inserted between power supply circuit 721 and control terminal 61 of burden circuit 31, and is controlled by a control signal from control circuit 71. When transistor 722 is turned on, an output voltage of power supply circuit 721 is applied to control terminal 61 of burden circuit 31 via transistor 722.

Detection section 73 detects the state (either the ON state or the OFF state) of switch 53 of burden circuit 33 closest to negative electrode P2 of the plurality of burden circuits 3. In other words, detection section 73 detects the state of switch 53 of burden circuit 33 farthest from reference point P0 (positive electrode P1) of the plurality of burden circuits 3. Specifically, detection section 73 is connected to a connection point between switch 53 and resistor 43 in burden circuit 33, that is, the source of switch 53. Detection section 73 detects that switch 53 is in the ON state when a voltage of more than or equal to a predetermined value is generated between the connection point between switch 53 and resistor 43 and negative electrode P2. An output of detection section 73 changes depending on the state of switch 53, becomes a high level when switch 53 is in the ON state, and becomes a low level when switch 53 is in the OFF state.

Abnormality determination section 74 determines abnormality of the plurality of burden circuits 3 by comparing the state of switch 51 of burden circuit 31 closest to positive electrode P1 of the plurality of burden circuits 3 with the state of switch 53 of burden circuit 33 closest to negative electrode P2 of the plurality of burden circuits 3. Abnormality determination section 74 acquires the state (either the ON state or the OFF state) of switch 53 of burden circuit 33 from detection section 73. Abnormality determination section 74 acquires the state (either the ON state or the OFF state) of switch 51 of burden circuit 31 from control circuit 71. As described in detail later, abnormality determination section 74 determines that there is an abnormality if the states of switches 51, 53 do not match. The "abnormality" in the present disclosure includes an open failure or a short failure of any switch 5, an open failure or a short failure of any resistor 4, and a disconnection of other circuits. A determination result of abnormality determination section 74 is output to, for example, the ECU of vehicle body 91, and when there is an abnormality in burden circuit 3, an indicator of vehicle body 91 or the like notifies a user.

(2.2) Operation

Figure 3A:
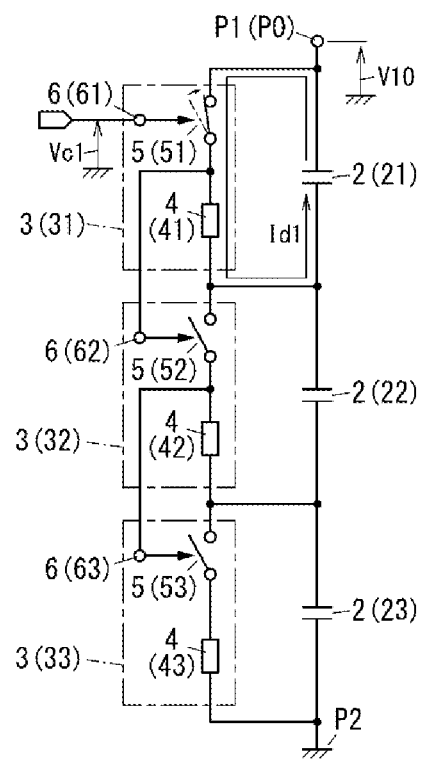
Figure 3B:
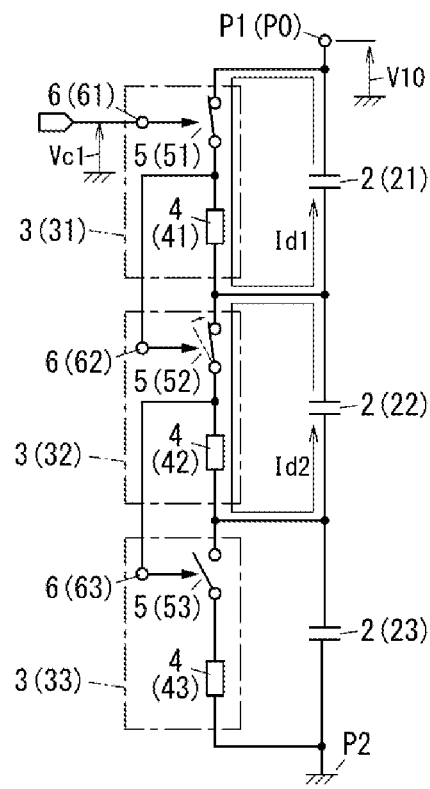
Figure 3C:
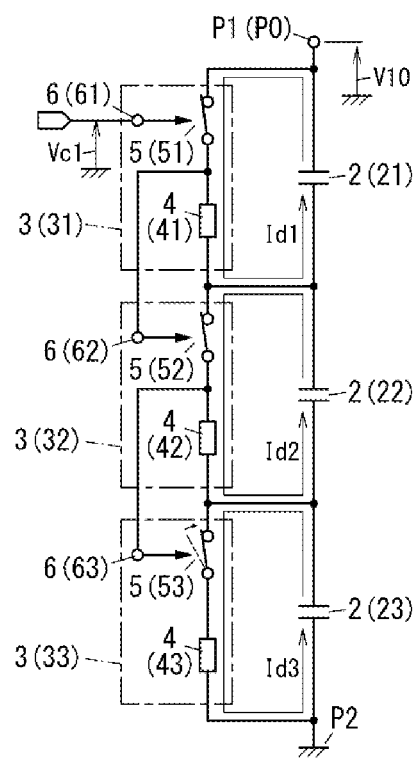

Next, the operation of power storage system 100 having the above configuration will be described with reference to FIGS. 3A to 3C. In FIGS. 3A to 3C, only power storage units 21, 22, 23 and burden circuits 31, 32, 33 are illustrated, and illustration of control circuit 71, driver circuit 72, detection section 73, abnormality determination section 74, and the like are appropriately omitted. Furthermore, in FIGS. 3A to 3C, switch 5 is schematically shown by a general switch circuit symbol.

First, as shown in FIG. 3A, switch 51 of highest burden circuit 31 is turned on by the control signal from control circuit 71 (see FIG. 1). In order for switch 51 to turn on, a voltage exceeding the threshold voltage needs to be applied between a gate and a source of switch 51. Here, when switch 51 is in the ON state, the source of switch 51 is connected to positive electrode P1, so that a potential of the source of switch 51 becomes the same potential as the potential on a high potential side of composite voltage V10. Thus, in order to turn on switch 51 of burden circuit 31, at least a voltage greater than composite voltage V10 needs to be applied to control terminal 61 of burden circuit 31. In the example of FIG. 3A, when transistor 722 (see FIG. 1) is turned on, voltage Vc1 (voltage greater than composite voltage V10) boosted by power supply circuit 721 (see FIG. 1) is applied to control terminal 61, and switch 51 is maintained in the ON state.

When switch 51 of burden circuit 31 is in the ON state, as shown in FIG. 3A, current Id1 flows from power storage unit 21 to resistor 41 of burden circuit 31 through switch 51.

Consequently, the electric energy stored in power storage unit 21 is consumed by resistor 41, so that power storage unit 21 is discharged.

After that, as shown in FIG. 3B, switch 52 of second burden circuit 32 from reference point P0 (positive electrode P1) is turned on. At this time, switch 52 is turned on by using the electric energy of power storage unit 21 in conjunction with turning on of switch 51. That is, when switch 51 of burden circuit 31 is turned on, switch 51 establishes electrical conduction between control terminal 62 of burden circuit 32 and the terminal closer to reference point P0 of power storage unit 21. Thus, a composite voltage of both end voltage V1 (see FIG. 1) of power storage unit 21 and both end voltage V2 (see FIG. 1) of power storage unit 22 is applied between a gate and a source of switch 52, so that switch 52 is turned on.

Once switch 52 is turned on, resistor 41 of burden circuit 31 is connected between the gate and the source of switch 52. At this time, since current Id1 flows from power storage unit 21 to resistor 41, a potential difference occurs between both ends of resistor 41 due to a voltage drop. Since a voltage corresponding to the potential difference is applied between the gate and the source of switch 52, switch 52 is maintained in the ON state.

When switch 52 of burden circuit 32 is in the ON state, as shown in FIG. 3B, current Id2 flows from power storage unit 22 to resistor 42 of burden circuit 32 through switch 52. Consequently, the electric energy stored in power storage unit 22 is consumed by resistor 42, so that power storage unit 22 is discharged.

After that, as shown in FIG. 3C, switch 53 of third burden circuit 33 from reference point P0 (positive electrode P1) is turned on. At this time, switch 53 is turned on by using the electric energy of power storage unit 22 in conjunction with turning on of switch 52. That is, when switch 52 of burden circuit 32 is turned on, switch 52 establishes electrical conduction between control terminal 63 of burden circuit 33 and the terminal closer to reference point P0 of power storage unit 22. Thus, a composite voltage of both end voltage V2 (see FIG. 1) of power storage unit 22 and both end voltage V3 (see FIG. 1) of power storage unit 23 is applied between a gate and a source of switch 53, so that switch 53 is turned on.

Once switch 53 is turned on, resistor 42 of burden circuit 32 is connected between the gate and the source of switch 53. At this time, since current Id2 flows from power storage unit 22 to resistor 42, a potential difference occurs between both ends of resistor 42 due to a voltage drop. Since a voltage corresponding to the potential difference is applied between the gate and the source of switch 53, switch 53 is maintained in the ON state.

When switch 53 of burden circuit 33 is in the ON state, as shown in FIG. 3C, current Id3 flows from power storage unit 23 to resistor 43 of burden circuit 33 through switch 53. Consequently, the electric energy stored in power storage unit 23 is consumed by resistor 43, so that power storage unit 23 is discharged.

As shown in FIG. 3C, when the plurality of switches 51, 52, 53 are all in the ON state, composite voltage V10 between positive electrode P1 and negative electrode P2 is divided according to the plurality of resistors 41, 42, 43, so that the both end voltage among the plurality of power storage units 2 is adjusted so as to reduce the variation in the both end voltage among the plurality of power storage units 2.

As described above, in discharge circuit 1, control circuit 71 only turns on switch 51 of highest burden circuit 31 to automatically turn on switches 52, 53 of remaining burden circuits 32, 33. Similarly, when all switches 5 of the plurality of burden circuits 3 in discharge circuit 1 are turned off, control circuit 71 only turns off switch 51 of highest burden circuit 31 to automatically turn off switches 52, 53 of remaining burden circuits 32, 33. As a result, in discharge circuit 1, all switches 5 of the plurality of burden circuits 3 can be controlled only by controlling switch 5 of highest burden circuit 3, and it is possible to simplify the circuit configuration.

By the way, in the present exemplary embodiment, abnormality determination section 74 determines the abnormality of the plurality of burden circuits 3 as follows. That is, abnormality determination section 74 determines the presence or absence of abnormality of the plurality of burden circuits 3 by comparing the state of switch 51 acquired from control circuit 71 with the state of switch 53 acquired from detection section 73. Specifically, according to a relationship between voltage Vc1 applied to control terminal 61 of burden circuit 31 and the output of detection section 73, abnormality determination section 74 makes a determination as shown in Table 1 below. In Table 1, "H" indicates high level, and "L" indicates low level.

TABLE 1

| Vc1 | Output of detection section | Determination result |
| --- | --- | --- |
| H | H | Normality |
| H | L | Abnormality (open failure) |
| L | H | Abnormality (short failure) |
| L | L | Normality |

In short, voltage Vc1 reflects the state of switch 51 of burden circuit 31 closest to positive electrode P1 of the plurality of burden circuits 3, and the output of detection section 73 reflects the state of switch 53 of burden circuit 33 closest to negative electrode P2 of the plurality of burden circuits 3. Thus, abnormality determination section 74 can indirectly compare the state of switch 51 and the state of switch 53 by comparing voltage Vc1 and the output of detection section 73. When voltage Vc1 applied to control terminal 61 and the output of detection section 73 are both high level or low level to match each other, abnormality determination section 74 determines that the result is "normality". On the other hand, if voltage Vc1 applied to control terminal 61 is at a high level (that is, switch 51 is in the ON state) and the output of detection section 73 is low level (that is, switch 53 is in the OFF state), abnormality determination section 74 determines that any switch 5 has an "open failure". On the other hand, if voltage Vc1 applied to control terminal 61 is at a low level (that is, switch 51 is in the OFF state) and the output of detection section 73 is high level (that is, switch 53 is in the ON state), abnormality determination section 74 determines that any switch 5 has a "short failure".

(3) Modification

The first exemplary embodiment is only one of various exemplary embodiments of the present disclosure. If the purpose of the present disclosure can be achieved, the first exemplary embodiment can be variously modified according to the design and the like. The modifications described below can be applied in appropriate combination.

(3.1) First Modification

Figure 4:
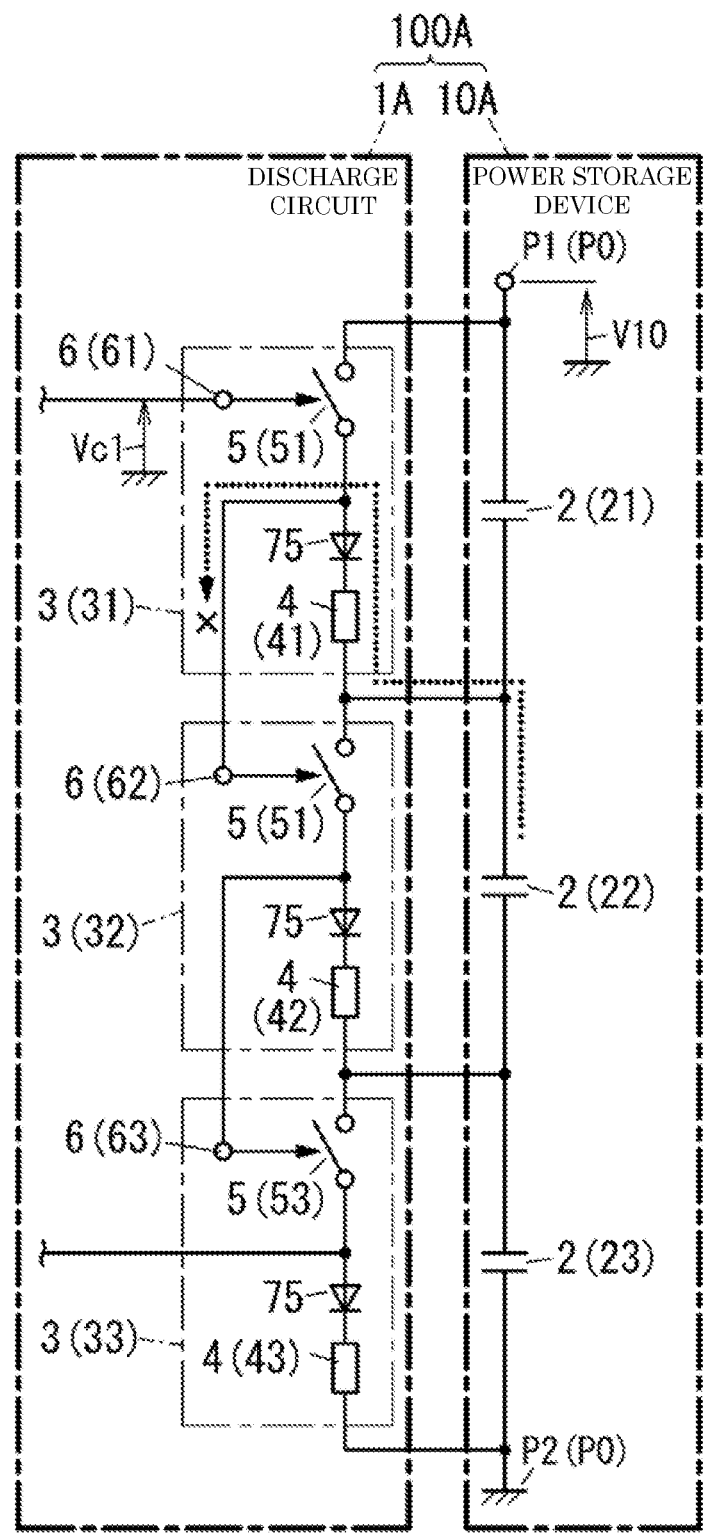
FIG. 4 is a schematic diagram showing a configuration of a power storage system according to a first modification of the first exemplary embodiment.

Power storage system 100A according to a first modification of the first exemplary embodiment differs from power storage system 100 according to the first exemplary embodiment in that, as shown in FIG. 4, at least one of the plurality of burden circuits 3 in discharge circuit 1A further has backflow limiting element 75. Hereinafter, common reference numerals are given to the configuration similar to that of the first exemplary embodiment, and an explanation thereof is omitted as appropriate. Power storage device 10A in power storage system 100A has the same configuration as power storage device 10 of the first exemplary embodiment.

Backflow limiting element 75 limits a current flowing to control terminal 6 through resistor 4. In the example of FIG. 4, the plurality of burden circuits 31, 32, 33 are all provided with backflow limiting element 75. Specifically, backflow limiting element 75 is implemented by a diode inserted between resistor 4 and switch 5 in each burden circuit 3. An anode of backflow limiting element 75 is electrically connected to (the source of) switch 5, and a cathode of backflow limiting element 75 is electrically connected to resistor 4. Here, control terminals 62, 63 electrically connected to a connection point between switch 5 and resistor 4 are electrically connected to the anode of backflow limiting element 75 (that is, a connection point between switch 5 and backflow limiting element 75). Consequently, backflow limiting element 75 limits (blocks) a reverse current from resistor 4 to switch 5 while forming a path for currents Id1, Id2, Id3 (see FIG. 3C) flowing to resistor 4 via switch 5 when switch 5 is turned on in each burden circuit 3.

FIG. 4 schematically represents the state where backflow limiting element 75 blocks the current by representing the current with a dotted line and adding an "x" mark. That is, by backflow limiting element 75, in n+1-th burden circuit 3 from reference point P0, the current from n+1-th power storage unit 2 from reference point P0 is prevented from flowing into control terminal 6 via resistor 4 of n-th burden circuit 3 from reference point P0. As a result, the potential difference between the gate and the source of switch 5 can be secured without being affected by the reverse current from resistor 4 to switch 5, and switch 5 can be stably maintained in the ON state.

(3.2) Other Modifications

Hereinafter, modifications other than the first modification of the first exemplary embodiment will be described below.

Power storage device 10 is not limited to an electric double layer capacitor, and may be, for example, an electrochemical device having a configuration described below. The electrochemical device described here includes a positive electrode member, a negative electrode member, and a nonaqueous electrolytic solution. The positive electrode member has a positive current collector and a positive electrode material layer supported on the positive current collector and containing a positive electrode active material. The positive electrode material layer contains a conductive polymer as a positive electrode active material doped and dedoped with anions (dopants). The negative electrode member has a negative electrode material layer containing a negative electrode active material. The negative electrode active material is, for example, a material that undergoes a redox reaction accompanied by occlusion and release of lithium ions, and is specifically a carbon material, a metal compound, an alloy, a ceramic material, or the like. The nonaqueous electrolytic solution has lithium ion conductivity, for example. This type of nonaqueous electrolytic solution contains a lithium salt and a nonaqueous solution in which the lithium salt is dissolved. The electrochemical device having such a configuration has a higher energy density than an electric double layer capacitor or the like.

Power storage device 10 is not limited to the electrochemical device having the above-described configuration, and may be, for example, a lithium ion capacitor or the like, or is not limited to a capacitor, and may be a secondary battery such as a lithium ion battery, a lead storage battery, or a lithium battery. Power storage device 10 may be configured by connecting a plurality of cells in series or in parallel.

Each resistor 4 is not limited to a fixed resistor having a constant resistance value, and may be a variable resistor having a variable resistance value. Each resistor 4 may be a resistance component formed in a semiconductor device, such as a diffused resistor. Each resistor 4 is not limited to a single element, and may be implemented by, for example, a combined resistance in which a plurality of electric resistance elements are electrically connected in series or in parallel. For example, like a collective resistor, a configuration in which a plurality of resistors 41, 42, 43 are integrated may be used.

Each switch 5 is not limited to the enhancement type n-channel MOSFET, and may be, for example, an insulated gate bipolar transistor (IGBT) or a thyristor. Further, each switch 5 may be a semiconductor switching element using a wide band gap semiconductor material such as gallium nitride (GaN). Further, each switch 5 is not limited to a semiconductor element, and may be configured by, for example, a semiconductor relay (SSR: Solid-State Relay) using a semiconductor switching element or a contact of a mechanical relay. Furthermore, each switch 5 is not limited to a single element, and may be implemented by, for example, a configuration in which a plurality of semiconductor switching elements are electrically connected in series.

Discharge circuit 1 is not limited to the configuration including three burden circuits 3, and may include two or four or more burden circuits 3. Power storage device 10 is not limited to the configuration including three power storage units 2 (cells), and may include two or four or more power storage units 2. Here, discharge circuit 1 is not limited to the configuration including the same number of burden circuits 3 as the plurality of cells included in power storage device 10. That is, when only some of the plurality of cells form the plurality of power storage units 2, discharge circuit 1 may include the plurality of burden circuits 3 corresponding to the plurality of power storage units 2, respectively.

Power storage system 100 is not limited to be mounted on automobiles (four-wheeled vehicles) and two-wheeled vehicles, and may be mounted on vehicles such as trains and electric carts, for example. Furthermore, power storage system 100 is not limited to be mounted on the vehicles, and may be mounted on moving bodies such as aircrafts, drones, construction machines, and ships.

Power storage system 100 is not limited to be mounted on the moving bodies, and may be used for, for example, a power conditioner or the like that converts DC power from a distributed power supply such as a solar cell or a storage battery into AC power and outputs the AC power to load 102 (equipment such as home electric appliances, or power system).

It is not an essential configuration of power storage system 100 that a plurality of constituent elements of power storage system 100 are housed in a single housing, and the constituent elements of power storage system 100 may be provided in a plurality of housings in a distributed manner.

For example, in power storage system 100, power storage device 10 and discharge circuit 1 may be provided in different housings.

Discharge circuit 1 is not limited to the configuration that functions as a balance circuit, and for example, may have a configuration that simply discharges power storage device 10.

Second Exemplary Embodiment

Figure 5:
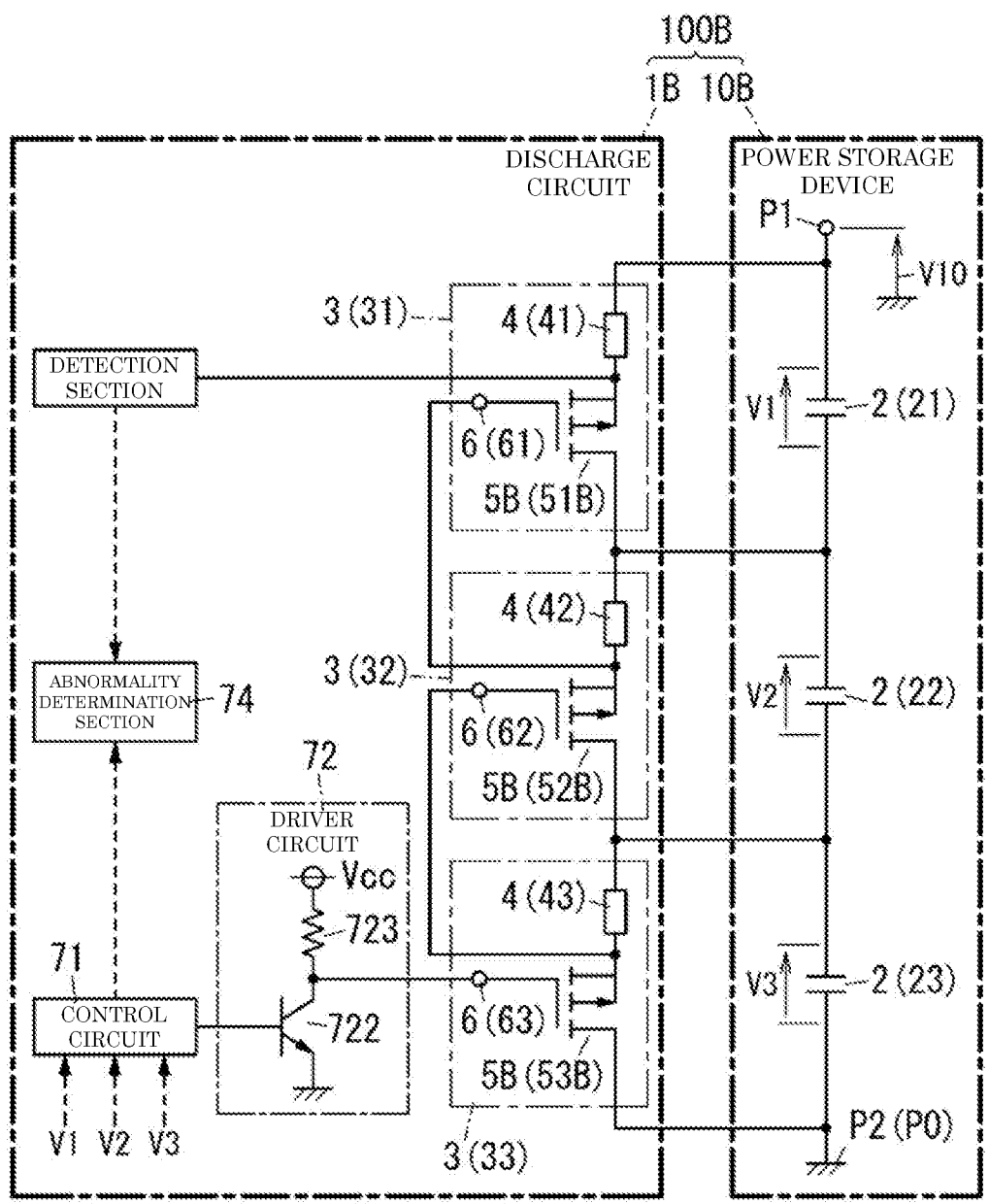
FIG. 5 is a schematic diagram showing a configuration of a power storage system according to a second exemplary embodiment.

As shown in FIG. 5, power storage system 100B according to the present exemplary embodiment differs from power storage system 100 according to the first exemplary embodiment in that reference point P0 is negative electrode P2. Hereinafter, common reference numerals are given to the configuration similar to that of the first exemplary embodiment, and an explanation thereof is omitted as appropriate. Power storage device 10B in power storage system 100B has the same configuration as power storage device 10 of the first exemplary embodiment.

In the present exemplary embodiment, each of the plurality of burden circuits 3 in discharge circuit 1B has resistor 4, switch 5B, and control terminal 6. Similarly to resistor 4 and switch 5 of the first exemplary embodiment, resistor 4 and switch 5B are electrically connected in series between both ends of each of the plurality of power storage units 2. However, in the present exemplary embodiment, in a series circuit of resistor 4 and switch 5B in each of the plurality of burden circuits 3, resistor 4 and switch 5B are connected in this order between both ends of corresponding power storage unit 2, when viewed from a terminal closer to positive electrode P1 of power storage unit 2. In other words, in each of the plurality of burden circuits 3, resistor 4 is electrically connected to the terminal closer to positive electrode P1 of corresponding power storage unit 2 through switch 5B.

In the present exemplary embodiment, switch 5B is, for example, a semiconductor element including an enhancement type p-channel MOSFET. Since switch 5B has a parasitic diode, switch 5B is connected in a direction in which a cathode of the parasitic diode is located closer to positive electrode P1 between positive electrode P1 and negative electrode P2 of power storage device 10 such that a current does not flow from positive electrode P1 to negative electrode P2 through the parasitic diode. That is, switch 5B is connected between both ends of power storage unit 2 such that a source is closer to positive electrode P1 and a drain is closer to negative electrode P2. Specifically, a source of switch 51B of burden circuit 31 is connected to a terminal (the same as positive electrode P1) closer to positive electrode P1 of power storage unit 21 via resistor 41, and a drain of switch 51B is connected to a terminal closer to negative electrode P2 of power storage unit 21. Similarly, a source of switch 52B of burden circuit 32 is connected to a terminal closer to positive electrode P1 of power storage unit 22 via resistor 42, and a drain of switch 52B is connected to a terminal closer to negative electrode P2 of power storage unit 22. A source of switch 53B of burden circuit 33 is connected to a terminal closer to positive electrode P1 of power storage unit 23 via resistor 43, and a drain of switch 53B is connected to a terminal (the same as positive electrode P2) closer to negative electrode P2 of power storage unit 23.

In the present exemplary embodiment, since switch 5B is the p-channel MOSFET as described above, control terminal 6 is a gate (or the terminal connected to the gate) of switch 5B. Specifically, switch 5B is turned off when a source-gate voltage is less than or equal to a predetermined threshold voltage, and is turned on when the voltage exceeds the threshold voltage. Thus, when the potential of control terminal 6 becomes such a potential that generates a potential difference exceeding the threshold voltage as compared with a source potential of switch 5B, switch 5B is turned on.

Here, control terminal 6 of n+1-th burden circuit 3 from reference point P0 is electrically connected, via switch 5B of n-th burden circuit 3 from reference point P0, to a terminal closer to reference point P0 of n-th power storage unit 2 from reference point P0 ("n" is a natural number). In the present exemplary embodiment, since negative electrode P2 is reference point P0 as described above, n-th burden circuit 3 and n-th power storage unit 2 from reference point P0 are represented by "burden circuit 3m" and "power storage unit 2m", respectively, by using "m=4−n".

In short, in n+1-th burden circuit 3 from reference point P0, control terminal 6 is electrically connected, via switch 5B of n-th burden circuit 3 from reference point P0, to n-th power storage unit 2 from reference point P0. Specifically, control terminal 62 of burden circuit 32 is connected to a connection point between switch 53B and resistor 43 of next higher burden circuit 33, that is, the source of switch 53B. Consequently, control terminal 62 of burden circuit 32 is electrically connected, via switch 53B of burden circuit 33, to the terminal closer to reference point P0 (negative electrode P2) of power storage unit 23. Similarly, control terminal 61 of burden circuit 31 is connected to a connection point between switch 52B and resistor 42 of next higher burden circuit 32, that is, the source of switch 52B. Consequently, control terminal 61 of burden circuit 31 is electrically connected, via switch 52B of burden circuit 32, to the terminal closer to reference point P0 (negative electrode P2) of power storage unit 22.

According to the above configuration, when switch 5B of n-th burden circuit 3 from reference point P0 (negative electrode P2) is turned on, control terminal 6 of n+1-th burden circuit 3 from reference point P0 is electrically connected to the terminal closer to reference point P0 of n-th power storage unit 2 from reference point P0. At this time, the potential of control terminal 6 of n+1-th burden circuit 3 from reference point P0 is changed by power storage unit 2, so that switch 5B of n+1-th burden circuit 3 from reference point P0 is turned on. In other words, when switch 5 of next higher burden circuit 3 is turned on, each of the plurality of switches 5B is turned on by using the electric energy stored in next higher power storage unit 2. In the example of FIG. 5, when switch 53B of burden circuit 33 is turned on, switch 52B of burden circuit 32 is turned on by using the electric energy of power storage unit 23 in conjunction with turning on of switch 53B. Similarly, when switch 52B of burden circuit 32 is turned on, switch 51B of burden circuit 31 is turned on by using the electric energy of power storage unit 22 in conjunction with turning on of switch 52B.

In the present exemplary embodiment, driver circuit 72 is a circuit that drives switch 53B of highest burden circuit 33. Here, driver circuit 72 has transistor 722 and resistor 723. A connection point of transistor 722 and resistor 723 is electrically connected to control terminal 63 of burden circuit 33. Reference voltage Vcc is applied to a series circuit of transistor 722 and resistor 723, and when transistor 722 is turned on, control terminal 63 of burden circuit 33 is electrically connected to reference point P0 (negative electrode P2).

Figure 6A:
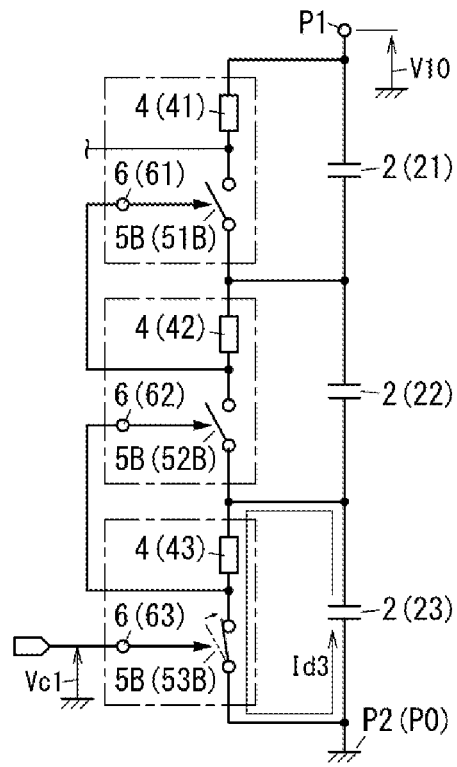
Figure 6B:
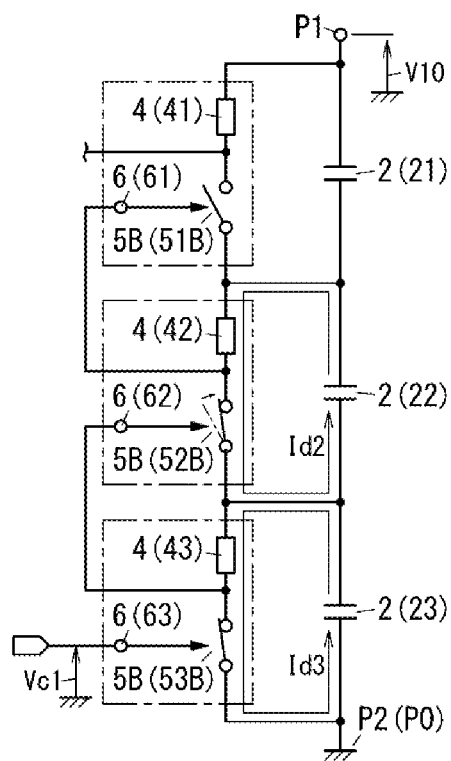
Figure 6C:
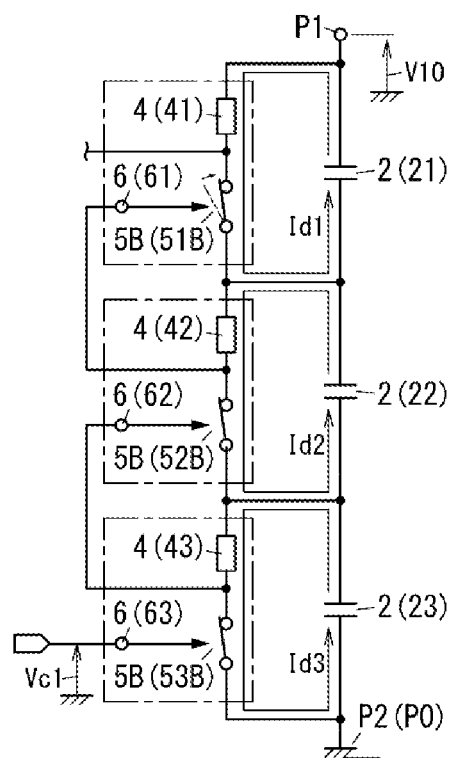

Next, the operation of discharge circuit 1B having the above configuration will be described with reference to FIGS. 6A to 6C. In FIGS. 6A to 6C, only power storage units 21, 22, 23 and burden circuits 31, 32, 33 are illustrated, and illustration of control circuit 71, driver circuit 72, detection section 73, abnormality determination section 74, and the like is appropriately omitted. Furthermore, in FIGS. 6A to 6C, switch 5B is schematically shown by a general switch circuit symbol.

First, as shown in FIG. 6A, switch 53B of highest burden circuit 33 is turned on by the control signal from control circuit 71 (see FIG. 5). At this time, transistor 722 (see FIG. 5) is turned on, so that both end voltage V3 (see FIG. 5) of power storage unit 23 is applied between a gate and a source of switch 53B, and switch 53B is maintained in the ON state.

When switch 53B of burden circuit 33 is in the ON state, as shown in FIG. 6A, current Id3 flows from power storage unit 23 to resistor 43 of burden circuit 33 through switch 53B. Consequently, the electric energy stored in power storage unit 23 is consumed by resistor 43, so that power storage unit 23 is discharged.

After that, as shown in FIG. 6B, switch 52B of second burden circuit 32 from reference point P0 (negative electrode P2) is turned on. At this time, switch 52B is turned on by using the electric energy of power storage unit 23 in conjunction with turning on of switch 53B. That is, when switch 53B of burden circuit 33 is turned on, switch 53B establishes electrical conduction between control terminal 62 of burden circuit 32 and the terminal closer to reference point P0 of power storage unit 23. Thus, a composite voltage of both end voltage V3 (see FIG. 5) of power storage unit 23 and both end voltage V2 (see FIG. 5) of power storage unit 22 is applied between a gate and a source of switch 52B, so that switch 52B is turned on.

Once switch 52B is turned on, resistor 43 of burden circuit 33 is connected between the gate and the source of switch 52B. At this time, since current Id3 flows from power storage unit 23 to resistor 43, a potential difference occurs between both ends of resistor 43 due to a voltage drop. Since a voltage corresponding to the potential difference is applied between the gate and the source of switch 52B, switch 52B is maintained in the ON state.

When switch 52B of burden circuit 32 is in the ON state, as shown in FIG. 6B, current Id2 flows from power storage unit 22 to resistor 42 of burden circuit 32 through switch 52B. Consequently, the electric energy stored in power storage unit 22 is consumed by resistor 42, so that power storage unit 22 is discharged.

After that, as shown in FIG. 6C, switch 51B of third burden circuit 31 from reference point P0 (negative electrode P2) is turned on. At this time, switch 51B is turned on by using the electric energy of power storage unit 22 in conjunction with turning on of switch 52B. That is, when switch 52B of burden circuit 32 is turned on, switch 52B establishes electrical conduction between control terminal 61 of burden circuit 31 and the terminal closer to reference point P0 of power storage unit 22. Thus, a composite voltage of both end voltage V2 (see FIG. 5) of power storage unit 22 and both end voltage V1 (see FIG. 5) of power storage unit 21 is applied between a gate and a source of switch 51B, so that switch 51B is turned on.

Once switch 51B is turned on, resistor 42 of burden circuit 32 is connected between the gate and the source of switch 51B. At this time, since current Id2 flows from power storage unit 22 to resistor 42, a potential difference occurs between both ends of resistor 42 due to a voltage drop. Since a voltage corresponding to the potential difference is applied between the gate and the source of switch 51B, switch 51B is maintained in the ON state.

When switch 51B of burden circuit 31 is in the ON state, as shown in FIG. 6C, current Id1 flows from power storage unit 21 to resistor 41 of burden circuit 31 through switch 51B. Consequently, the electric energy stored in power storage unit 21 is consumed by resistor 41, so that power storage unit 21 is discharged.

As described above, in discharge circuit 1B, control circuit 71 only turns on switch 53B of highest burden circuit 33 to automatically turn on switches 52B, 51B of remaining burden circuits 32, 31. Similarly, when all switches 5B of the plurality of burden circuits 3 in discharge circuit 1B are turned off, control circuit 71 only turns off switch 53B of highest burden circuit 33 to automatically turn off switches 52B, 51B of remaining burden circuits 32, 31. As a result, in discharge circuit 1B, all switches 5 of the plurality of burden circuits 3 can be controlled only by controlling switch 5 of highest burden circuit 3, and it is possible to simplify the circuit configuration.

According to discharge circuit 1B of the present exemplary embodiment, the gate of switch 53B may be connected to reference point P0 (negative electrode P2) when switch 53B of highest burden circuit 33 is turned on, so that power supply circuit 721 as in the first exemplary embodiment is unnecessary. Therefore, the configuration of driver circuit 72 can be simplified.

Also in the present exemplary embodiment, as in the first modification of the first exemplary embodiment, at least one of the plurality of burden circuits 3 may further have backflow limiting element 75 (see FIG. 4). In this case, backflow limiting element 75 is implemented by a diode inserted between resistor 4 and switch 5B in each burden circuit 3. A cathode of backflow limiting element 75 is electrically connected to (the source of) switch 5B, and an anode of backflow limiting element 75 is electrically connected to resistor 4. Here, control terminals 61, 62 electrically connected to a connection point between switch 5B and resistor 4 are electrically connected to the cathode of backflow limiting element 75 (that is, a connection point between switch 5B and backflow limiting element 75). Consequently, backflow limiting element 75 limits (blocks) a reverse current from resistor 4 to switch 5B while forming a path for currents Id1, Id2, Id3 (see FIG. 6C) flowing to resistor 4 through switch 5B when switch 5B is turned on in each burden circuit 3.

The configuration (including modifications) described in the second exemplary embodiment can be applied in combination with the configuration (including modifications) described in the first exemplary embodiment as appropriate.

Third Exemplary Embodiment

Figure 7:
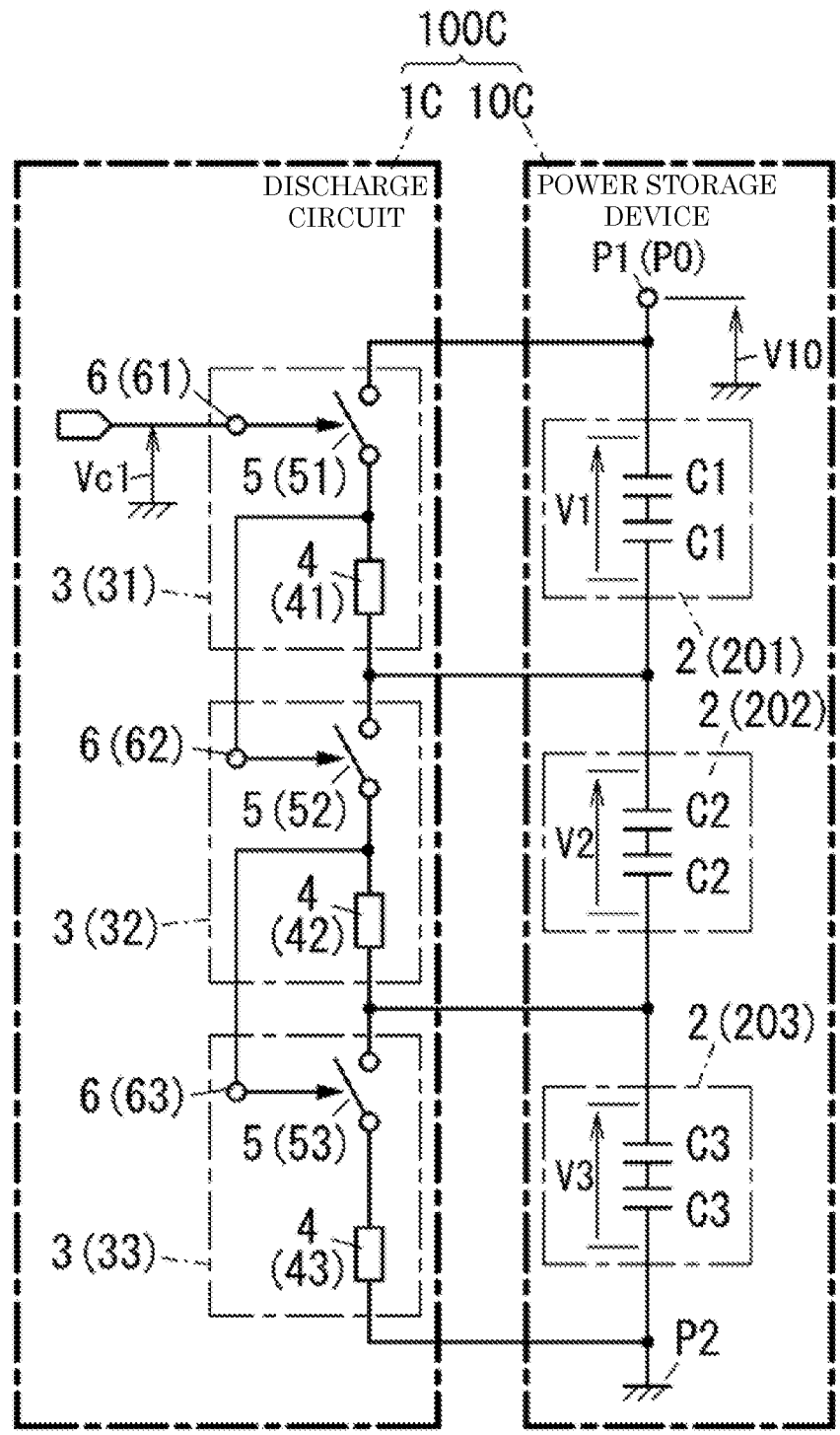
FIG. 7 is a schematic diagram showing a configuration of a power storage system according to a third exemplary embodiment.

Power storage system 100C according to the present exemplary embodiment differs from power storage system 100 according to the first exemplary embodiment in that, as shown in FIG. 7, the plurality of power storage units 2 include first power storage unit 201 and second power storage unit 202. Hereinafter, common reference numerals are given to the configuration similar to that of the first exemplary embodiment, and an explanation thereof is omitted as appropriate.

In FIG. 7, only power storage device 10C and burden circuits 31, 32, 33 are illustrated, and illustration of control circuit 71, driver circuit 72, detection section 73, abnormality determination section 74, and the like are appropriately omitted. Furthermore, in FIG. 7, switch 5 is schematically shown by a general switch circuit symbol.

First power storage unit 201 includes a pair of first cells C1 electrically connected in series. Second power storage unit 202 includes a pair of second cells C2 electrically connected in series. In the present exemplary embodiment, power storage device 10C further includes third power storage unit 203 including a pair of third cells C3 electrically connected in series. The pair of first cells C1 are electrically connected in series between positive electrode P1 and negative electrode P2. Similarly, the pair of second cells C2 are electrically connected in series between positive electrode P1 and negative electrode P2, and the pair of third cells C3 are electrically connected in series between positive electrode P1 and negative electrode P2. That is, in the first exemplary embodiment, each of the plurality of cells constitutes power storage unit 2, whereas in the present exemplary embodiment, each set of cells when the plurality of cells are divided into pairs each having two cells constitutes power storage unit 2.

Here, first power storage unit 201 and second power storage unit 202 are directly connected in series between positive electrode P1 and negative electrode P2 such that first power storage unit 201 is located closer to reference point P0 (positive electrode P1). That is, a terminal closer to positive electrode P1 of second power storage unit 202 is directly connected to a terminal closer to negative electrode P2 of first power storage unit 201. In the present exemplary embodiment, third power storage unit 203 is electrically connected between second power storage unit 202 and negative electrode P2. First power storage unit 201, second power storage unit 202, and third power storage unit 203 are electrically connected in series in this order between positive electrode P1 and negative electrode P2 when viewed from positive electrode P1.

Here, a rated voltage of the both end voltage of each cell (each of first cell C1, second cell C2, and third cell C3) is, for example, 2.5 [V]. Thus, the rated voltage of both end voltages V1, V2, V3 of each power storage unit 2 (first power storage unit 201, second power storage unit 202, and third power storage unit 203) is, for example, 5.0 [V]. Thus, in the configuration in which three power storage units 2 are electrically connected in series, if both end voltages V1, V2, V3 of all power storage units 2 are at the rated voltage, composite voltage V10 of 15 [V] is generated between positive electrode P1 and negative electrode P2.

In the example of FIG. 7, the configuration of discharge circuit 1C is basically the same as the configuration of discharge circuit 1 according to the first exemplary embodiment. That is, the plurality of burden circuits 3 in discharge circuit 1C are electrically connected in parallel to corresponding power storage units 2, respectively. That is, as shown in FIG. 7, burden circuit 31 is electrically connected in parallel to first power storage unit 201, burden circuit 32 is electrically connected in parallel to second power storage unit 202, and burden circuit 33 is electrically connected in parallel to third power storage unit 203.

If switches 51, 52, 53 are turned on in all of the plurality of burden circuits 31, 32, 33, resistors 41, 42, 43 of the plurality of burden circuits 31, 32, 33 are electrically connected in series and become a plurality of voltage dividing resistors. Then, the voltage between positive electrode P1 and negative electrode P2 is divided according to the plurality of voltage dividing resistors (resistors 41, 42, 43), and a divided voltage is applied to each of the plurality of power storage units 2.

Consequently, discharge circuit 1 functions as a balance circuit, and both end voltages V1, V2, V3 of each power storage unit 2 in power storage device 10 can be adjusted so as to reduce variation among the plurality of power storage units 2. That is, in the present exemplary embodiment, the resistance values of the plurality of resistors 41, 42, 43 are substantially identical, and composite voltage V10 (15 [V]) between positive electrode P1 and negative electrode P2 is divided into three equal voltages by the plurality of resistors 41, 42, 43. Thus, a divided reference voltage (5.0 [V]) of substantially the same magnitude is generated between both ends of each resistor 4, and this voltage is applied to each power storage unit 2 to adjust both end voltages V1, V2, V3 of each power storage unit 2 such that voltages V1, V2, V3 approach the reference voltage.

According to this configuration, for example, even if the rated voltage of the both end voltage of each cell (each of first cell C1, second cell C2, and third cell C3) is relatively small, a voltage applied between the gate and the source of switch 5 is relatively large. Therefore, when switch 5 is driven by both end voltages V1, V2, V3 of each power storage unit 2, there are advantages that a voltage sufficiently greater than the threshold voltage can be applied between the gate and the source of switch 5, and control of switch 5 is stabilized.

Figure 8:
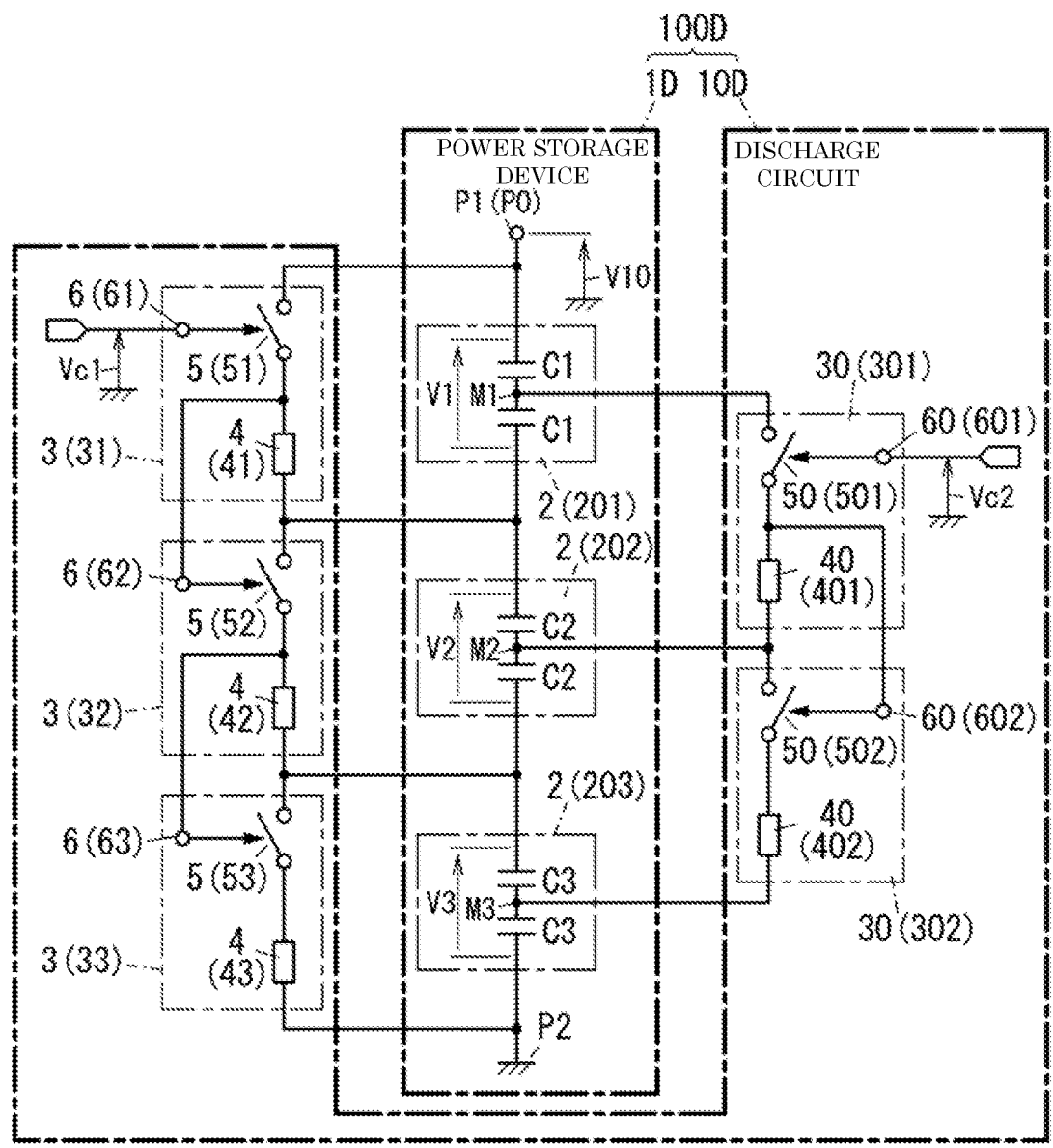
FIG. 8 is a schematic diagram showing a configuration of a power storage system according to a modification of the third exemplary embodiment.

FIG. 8 is a schematic diagram showing a configuration of power storage system 100D according to a modification of the third exemplary embodiment. In power storage system 100D shown in FIG. 8, discharge circuit 1D further includes at least one (two in the example of FIG. 8) auxiliary burden circuit 30. Hereinafter, common reference numerals are given to the configuration similar to that of the third exemplary embodiment, and an explanation thereof is omitted as appropriate.

In FIG. 8, only power storage device 10D, burden circuits 31, 32, 33, and auxiliary burden circuit 30 are illustrated, and illustration of control circuit 71, driver circuit 72, detection section 73, abnormality determination section 74, and the like is appropriately omitted. Furthermore, in FIG. 8, switch 5 and auxiliary switch 50 are schematically shown by a general switch circuit symbol.

Here, each of the plurality of auxiliary burden circuits 30 has a configuration corresponding to burden circuit 3. That is, each of the plurality of auxiliary burden circuits 30 has auxiliary resistor 40, auxiliary switch 50, and auxiliary control terminal 60. Auxiliary resistor 40 and auxiliary switch 50 are electrically connected in series. Auxiliary control terminal 60 controls auxiliary switch 50 according to a potential of auxiliary control terminal 60. The plurality of auxiliary burden circuits 30 are electrically connected in series between positive electrode P1 and negative electrode P2. Each auxiliary switch 50 is, for example, a semiconductor element including an enhancement type n-channel MOSFET.

When the plurality of auxiliary burden circuits 30 are distinguished, the plurality of auxiliary burden circuits 30 are referred to respectively as "auxiliary burden circuit 301" and "auxiliary burden circuit 302" in order from positive electrode P1. When auxiliary resistors 40 of respective auxiliary burden circuits 30 are distinguished, auxiliary resistors 40 of auxiliary burden circuits 301, 302 are referred to respectively as "auxiliary resistor 401" and "auxiliary resistor 402". Similarly, auxiliary switches 50 of auxiliary burden circuits 301, 302 are referred to respectively as "auxiliary switch 501" and "auxiliary switch 502", and auxiliary control terminals 60 of auxiliary burden circuits 301, 302 are referred to respectively as "auxiliary control terminal 601" and "auxiliary control terminal 602".

Here, auxiliary resistor 401 and auxiliary switch 501 of auxiliary burden circuit 301 are electrically connected in series between a middle point of the pair of first cells C1 and a middle point of the pair of second cells C2. In other words, discharge circuit 1D includes auxiliary resistor 40 and auxiliary switch 50 electrically connected in series between middle point M1 of the pair of first cells C1 and middle point M2 of the pair of second cells C2. Auxiliary resistor 402 and auxiliary switch 502 of auxiliary burden circuit 302 are electrically connected in series between middle point M2 of the pair of second cells C2 and middle point M3 of the pair of third cells C3.

According to this configuration, when auxiliary switches 50 are turned on for all of the plurality of auxiliary burden circuits 30, discharge in auxiliary burden circuit 30 is performed for the cells between middle point M1 and middle point M3. At this time, the plurality of auxiliary resistors 40 in the plurality of auxiliary burden circuits 30 are electrically connected in series between positive electrode P1 and negative electrode P2 of power storage device 10D. That is, if auxiliary switches 501, 502 are turned on in all of the plurality of auxiliary burden circuits 301, 302, auxiliary resistors 401, 402 of the plurality of auxiliary burden circuits 301, 302 are electrically connected in series and become a plurality of voltage dividing resistors. A voltage between middle points M1 and M3 is divided according to the plurality of voltage dividing resistors (auxiliary resistors 401, 402), and a divided voltage is applied between middle points M1 and M2 and between middle points M2 and M3.

Consequently, the plurality of auxiliary burden circuits 301, 302 function as a balance circuit, and the both end voltage of each cell in power storage device 10D can be adjusted so as to reduce variation among the plurality of cells. That is, in the example of FIG. 8, the resistance values of the plurality of auxiliary resistors 401, 402 are substantially identical, and the voltage (10.0 [V]) between middle points M1 and M3 is divided into two equal voltages by the plurality of auxiliary resistors 401, 402. Thus, a divided reference voltage (5.0 [V]) of substantially the same magnitude is generated between both ends of each auxiliary resistor 40, and this voltage is applied between middle points M1 and M2 and between middle points M2 and M3 to adjust the both end voltage of each cell such that the voltages approach the reference voltage. Specifically, auxiliary burden circuit 301 applies the both end voltage of auxiliary resistor 401 to a series circuit of first cell C1 on a low potential side and second cell C2 on a high potential side. Auxiliary burden circuit 302 applies the both end voltage of auxiliary resistor 402 to a series circuit of second cell C2 on the low potential side and third cell C3 on the high potential side.

In short, the plurality of auxiliary burden circuits 30 adjust the both end voltage of each cell so as to reduce variation in the both end voltage of each cell between the cells in a combination different from that of the plurality of burden circuits 3. As a result, according to discharge circuit 1D, the variation in the both end voltage of each cell among the plurality of cells in power storage device 10D can be more precisely adjusted to be small, compared to the configuration without the plurality of auxiliary burden circuits 30.

In the example of FIG. 8, auxiliary control terminal 602 of auxiliary burden circuit 302 is connected to a connection point between auxiliary switch 501 and auxiliary resistor 401 of next higher auxiliary burden circuit 301. Auxiliary control terminal 602 of auxiliary burden circuit 301 is electrically connected to driver circuit 72 (see FIG. 1). In the example of FIG. 8, when transistor 722 (see FIG. 1) is turned on, voltage Vc2 boosted by power supply circuit 721 (see FIG. 1) is applied to auxiliary control terminal 601, and auxiliary switch 501 is maintained in the ON state. Consequently, auxiliary control terminal 602 of auxiliary burden circuit 302 is electrically connected, via auxiliary switch 501 of auxiliary burden circuit 301, to middle point M1 of the pair of first cells C1. Thus, also in the plurality of auxiliary burden circuits 30, similarly to the plurality of burden circuits 3, auxiliary switch 501 of highest auxiliary burden circuit 301 is only turned on to automatically turn on auxiliary switch 502 of remaining auxiliary burden circuit 302. Thus, control circuit 71 may perform ON/OFF control only for auxiliary switch 501 of highest auxiliary burden circuit 301.

As another modification of the third exemplary embodiment, the plurality of power storage units 2 may include first power storage unit 201 including the pair of first cells C1 and second power storage unit 202 including the pair of second cells C2, and third power storage unit 203 can be omitted as appropriate. The plurality of power storage units 2 may further include a power storage unit including one or a plurality of cells in addition to third power storage unit 203 including the pair of third cells C3 or in place of third power storage unit 203.

The configuration (including modifications) described in the third exemplary embodiment can be applied in combination with the configuration (including modifications) described in the first exemplary embodiment and the configuration (including modifications) described in the second exemplary embodiment as appropriate.

SUMMARY

As described above, discharge circuit (1, 1A to 1D) for power storage device (10, 10A to 10D) according to the first aspect is used for power storage device (10, 10A to 10D) including the plurality of power storage units (2) that are electrically connected in series between positive electrode (P1) and negative electrode (P2). Discharge circuit (1, 1A to 1D) includes the plurality of burden circuits (3) that are electrically connected in parallel to the plurality of power storage units (2), respectively. Each of the plurality of burden circuits (3) includes (i) resistor (4) and switch (5, 5B) that are electrically connected in series between both ends of a corresponding one of the plurality of power storage units (2), and (ii) control terminal (6) that controls switch (5, 5B) according to the potential of control terminal (6). The plurality of burden circuits (3) are electrically connected in series between positive electrode (P1) and negative electrode (P2). Control terminal (6) of n+1-th burden circuit (3) from reference point (P0) among the plurality of burden circuits (3) is electrically connected, via switch (5, 5B) of n-th burden circuit (3) from reference point (P0) among the plurality of burden circuits (3), to the terminal closer to reference point (P0) (a reference point side terminal) of n-th power storage unit (2) from reference point (P0) among the plurality of power storage units (2). Reference point (P0) is positive electrode (P1) or negative electrode (P2).

According to this aspect, when switch (5, 5B) of n-th burden circuit (3) from reference point (P0) is turned on, control terminal (6) of n+1-th burden circuit (3) from reference point (P0) is connected to the terminal closer to reference point (P0) of n-th power storage unit (2) from reference point (P0). At this time, the potential of control terminal (6) of n+1-th burden circuit (3) from reference point (P0) is changed by power storage unit (2), so that switch (5, 5B) of n+1-th burden circuit (3) from reference point (P0) is turned on. In other words, when switch (5, 5B) of next higher burden circuit (3) is turned on, each of the plurality of switches (5, 5B) is turned on by using the electric energy stored in next higher power storage unit (2). As a result, according to discharge circuit (1, 1A to 1D), switch (5, 5B) of highest burden circuit (3) is only turned on to automatically turn on switch (5, 5B) of remaining burden circuit (3). As described above, according to discharge circuit (1, 1A to 1D), switches (5, 5B) of the plurality of burden circuits (3) are interlocked with each other to be turned on in a domino manner from the higher order to the lower order. Therefore, all switches (5, 5B) of the plurality of burden circuits (3) can be controlled only by controlling switch (5, 5B) of highest burden circuit (3), and it is possible to simplify the circuit configuration.

In discharge circuit (1, 1A to 1D) according to the second aspect, in a state that switches (5, 5B) are turned on in all of the plurality of burden circuits (3) in the first aspect, resistor (4) of each of the plurality of burden circuits (3) is served as one of a plurality of voltage dividing resistors that are electrically connected in series between the positive electrode and the negative electrode. The divided voltage, which is obtained from dividing the voltage between positive electrode (P1) and negative electrode (P2) according to the plurality of voltage dividing resistors, is applied to each of the plurality of power storage units (2).

According to this aspect, discharge circuit (1, 1A to 1D) functions as a balance circuit, and the both end voltage of each of power storage units (2) in power storage device (10, 10A to 10D) can be adjusted so as to reduce the variation among the plurality of power storage units (2).

In discharge circuit (1, 1A to 1D) according to the third aspect, in the first or second aspect, reference point (P0) is positive electrode (P1).

According to this aspect, switch (5, 5B) closest to positive electrode (P1) is only turned on to turn on switches (5, 5B) of the plurality of burden circuits (3) in a domino manner from positive electrode (P1) to negative electrode (P2). In this aspect, switch (5, 5B) can be implemented by, for example, an n-channel MOSFET.

In discharge circuit (1, 1A to 1D) according to the fourth aspect, in the first or second aspect, reference point (P0) is negative electrode (P2).

According to this aspect, switch (5, 5B) closest to the negative electrode (P2) is only turned on to turn on switches (5, 5B) of the plurality of burden circuits (3) in a domino manner from negative electrode (P2) to positive electrode (P1). In this aspect, since switch (5, 5B) closest to negative electrode (P2) is turned on, for example, a power supply circuit such as a charge pump circuit is not required, and the configuration of the driver circuit can be simplified.

Discharge circuit (1, 1A to 1D) according to the fifth aspect further includes abnormality determination section (74) in any one of the first to fourth aspects. Abnormality determination section (74) compares the state of switch (5, 5B) of burden circuit (3) closest to positive electrode (P1) of the plurality of burden circuits (3) with the state of switch (5, 5B) of burden circuit (3) closest to negative electrode (P2) of the plurality of burden circuits (3). Consequently, abnormality determination section (74) determines the abnormality of the plurality of burden circuits (3).

According to this aspect, abnormality determination section (74) can determine the abnormality of the plurality of burden circuits (3) only by comparing the states of two switches (5, 5B).

In discharge circuit (1, 1A to 1D) according to the sixth aspect, in any one of the first to fifth aspects, at least one of the plurality of burden circuits (3) further has backflow limiting element (75). Backflow limiting element (75) limits the current flowing to control terminal (6) via resistor (4).

According to this aspect, it becomes easier to secure the potential difference for maintaining switch (5, 5B) in the ON state, and switch (5, 5B) can be stably maintained in the ON state.

In discharge circuit (1, 1A to 1D) according to the seventh aspect, in any one of the first to sixth aspects, the plurality of power storage units (2) include first power storage unit (201) and second power storage unit (202). First power storage unit (201) includes the pair of first cells (C1) electrically connected in series. Second power storage unit (202) includes the pair of second cells (C2) electrically connected in series. First power storage unit (201) and second power storage unit (202) are directly connected in series between positive electrode (P1) and negative electrode (P2) such that first power storage unit (201) is located closer to reference point (P0).

According to this aspect, for example, even when the rated voltage of the both end voltage of each cell is relatively small, it becomes easier to secure the potential difference for maintaining switch (5, 5B) in the ON state, and switch (5, 5B) can be stably maintained in the ON state.

Discharge circuit (1, 1A to 1D) according to the eighth aspect further includes auxiliary resistor (40) and auxiliary switch (50) in the seventh aspect. Auxiliary resistor (40) and auxiliary switch (50) are electrically connected in series between middle point (M1) of the pair of first cells (C1) and middle point (M2) of the pair of second cells (C2).

According to this aspect, the variation in the both end voltage of each cell among the plurality of cells in power storage device (10, 10A to 10D) can be more precisely adjusted to be small.

Power storage system (100, 100A to 100D) according to the ninth aspect includes discharge circuit (1, 1A to 1D) according to any one of the first to eighth aspects and power storage device (10, 10A to 10D).

According to this aspect, when switch (5, 5B) of n-th burden circuit (3) from reference point (P0) is turned on, control terminal (6) of n+1-th burden circuit (3) from reference point (P0) is connected to the terminal closer to reference point (P0) of n-th power storage unit (2) from reference point (P0). At this time, the potential of control terminal (6) of n+1-th burden circuit (3) from reference point (P0) is changed by power storage unit (2), so that switch (5, 5B) of n+1-th burden circuit (3) from reference point (P0) is turned on. In other words, when switch (5, 5B) of next higher burden circuit (3) is turned on, each of the plurality of switches (5, 5B) is turned on by using the electric energy stored in next higher power storage unit (2). As a result, according to power storage system (100, 100A to 100D), switch (5, 5B) of highest burden circuit (3) is only turned on to automatically turn on switch (5, 5B) of remaining burden circuit (3). As described above, according to power storage system (100, 100A to 100D), switches (5, 5B) of the plurality of burden circuits (3) are interlocked with each other to be turned on in a domino manner from the higher order to the lower order. Therefore, all switches (5, 5B) of the plurality of burden circuits (3) can be controlled only by controlling switch (5, 5B) of highest burden circuit (3), and it is possible to simplify the circuit configuration.

Vehicle (9) according to the tenth aspect includes power storage system (100, 100A to 100D) according to the ninth aspect and vehicle body (91) provided with power storage system (100, 100A to 100D).

According to this aspect, when switch (5, 5B) of n-th burden circuit (3) from reference point (P0) is turned on, control terminal (6) of n+1-th burden circuit (3) from reference point (P0) is connected to the terminal closer to reference point (P0) of n-th power storage unit (2) from reference point (P0). At this time, the potential of control terminal (6) of n+1-th burden circuit (3) from reference point (P0) is changed by power storage unit (2), so that switch (5, 5B) of n+1-th burden circuit (3) from reference point (P0) is turned on. In other words, when switch (5, 5B) of next higher burden circuit (3) is turned on, each of the plurality of switches (5, 5B) is turned on by using the electric energy stored in next higher power storage unit (2). As a result, according to vehicle (9), switch (5, 5B) of highest burden circuit (3) is only turned on to automatically turn on switch (5, 5B) of remaining burden circuit (3). As described above, according to vehicle (9), switches (5, 5B) of the plurality of burden circuits (3) are interlocked with each other to be turned on in a domino manner from the higher order to the lower order. Therefore, all switches (5, 5B) of the plurality of burden circuits (3) can be controlled only by controlling switch (5, 5B) of highest burden circuit (3), and it is possible to simplify the circuit configuration.

The configurations according to the second to eighth aspects are not essential for discharge circuit (1, 1A to 1D) and can be omitted as appropriate.

What is claimed is:

1. A discharge circuit for a power storage device including a plurality of power storage units that are electrically connected in series between a positive electrode and a negative electrode, the discharge circuit comprising
    a plurality of burden circuits that are electrically connected in parallel to the plurality of power storage units, respectively, wherein:
    each of the plurality of burden circuits includes (i) a resistor and a switch that are electrically connected in series between both ends of a corresponding one of the plurality of power storage units, and (ii) a control terminal that controls the switch according to a potential of the control terminal,
    the plurality of burden circuits are electrically connected in series between the positive electrode and the negative electrode, and
    the control terminal of a n+1-th burden circuit from a reference point among the plurality of burden circuits is electrically connected, via the switch of a n-th burden circuit from the reference point among the plurality of burden circuits, to a reference point side terminal of a n-th power storage unit from the reference point among the plurality of power storage units, the reference point being the positive electrode or the negative electrode.

2. The discharge circuit for a power storage device according to claim 1, wherein:
    in a state that the switch is turned on in all of the plurality of burden circuits,
    the resistor of each of the plurality of burden circuits is served as one of a plurality of voltage dividing resistors that are electrically connected in series between the positive electrode and the negative electrode, and
    a divided voltage is applied to each of the plurality of power storage units, the divided voltage being obtained from dividing a voltage between the positive electrode and the negative electrode according to the plurality of voltage dividing resistors.

3. The discharge circuit for a power storage device according to claim 1, wherein the reference point is the positive electrode.

4. The discharge circuit for a power storage device according to claim 1, wherein the reference point is the negative electrode.

5. The discharge circuit for a power storage device according to claim 1, the discharge circuit further comprising an abnormality determination section that determines abnormality of the plurality of burden circuits by comparing a state of the switch of a burden circuit closest to the positive electrode among the plurality of burden circuits with a state of the switch of a burden circuit closest to the negative electrode among the plurality of burden circuits.

6. The discharge circuit for a power storage device according to claim 1, wherein at least one of the plurality of burden circuits further includes a backflow limiting element that limits a current flowing to the control terminal via the resistor.

7. The discharge circuit for a power storage device according to claim 1, wherein:
    the plurality of power storage units include a first power storage unit and a second power storage unit, the first power storage unit including a pair of first cells electrically connected in series, the second power storage unit including a pair of second cells electrically connected in series, and
    the first power storage unit and the second power storage unit are directly connected in series between the positive electrode and the negative electrode, the first power storage unit being located close to the reference point.

8. The discharge circuit for a power storage device according to claim 7, the discharge circuit further comprising an auxiliary resistor and an auxiliary switch that are electrically connected in series between a middle point of the pair of the first cells and a middle point of the pair of the second cells.

9. A power storage system comprising:
    the discharge circuit for a power storage device according to claim 1; and
    the power storage device.

10. A vehicle comprising:
    the power storage system according to claim 9; and
    a vehicle body provided with the power storage system.

* * * * *